US012621074B2

(12) United States Patent
Diachina et al.

(10) Patent No.: US 12,621,074 B2
(45) Date of Patent: May 5, 2026

(54) TECHNIQUE FOR TRANSPORTING A TIME PROTOCOL MESSAGE FOR TIME-SENSITIVE NETWORKING

(71) Applicant: Telefonaktiebolaget LM Ericsson (publ), Stockholm (SE)

(72) Inventors: John Walter Diachina, Garner, NC (US); Kun Wang, Solna (SE); Paul Schliwa-Bertling, Ljungsbro (SE); Dhruvin Patel, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 604 days.

(21) Appl. No.: 18/009,209

(22) PCT Filed: Jun. 10, 2021

(86) PCT No.: PCT/EP2021/065588
§ 371 (c)(1),
(2) Date: Dec. 8, 2022

(87) PCT Pub. No.: WO2021/250158
PCT Pub. Date: Dec. 16, 2021

(65) Prior Publication Data
US 2023/0239065 A1     Jul. 27, 2023

Related U.S. Application Data

(60) Provisional application No. 63/037,502, filed on Jun. 10, 2020.

(51) Int. Cl.
*H04J 3/06* (2006.01)
*H04W 28/02* (2009.01)

(52) U.S. Cl.
CPC ....... *H04J 3/0667* (2013.01); *H04W 28/0268* (2013.01)

(58) Field of Classification Search
CPC ....... H04L 5/14; H04L 47/2416; H04L 47/28; H04J 3/0667; H04W 28/0268; H04W 56/0065
See application file for complete search history.

(56) References Cited

U.S. PATENT DOCUMENTS 11,895,528 B2 *   2/2024  Ha .................... H04W 28/0268
2002/0051431 A1   5/2002  Choi et al.
(Continued)

FOREIGN PATENT DOCUMENTS

WO       2020081062 A1    4/2020
WO       2020093000 A1    5/2020
(Continued)

OTHER PUBLICATIONS

IEEE, "Time-sensitive networking profile for industrial automation", Revised draft of IEC/IEEE 60802 Standard, IEC/IEEE:2022 (D1.4), Par approval Date May 14, 2018, pp. 1-108, IEEE.
(Continued)

*Primary Examiner* — Bailor C Hsu
(74) *Attorney, Agent, or Firm* — COATS & BENNETT, PLLC

(57) ABSTRACT

A technique of transporting a time protocol message for time-sensitive networking, TSN, from a first station (910) to a second station (920) through a wireless network (900) including at least one radio device wirelessly connected to at least one base station (400) of the wireless network (900) is provided. As to a method aspect, a method performed by at least one or each of the at least one radio device comprises a step of transmitting to the wireless network (900) a radio device request message requesting establishment of a packet data unit, PDU, session between the radio device and the wireless network (900), the radio device request message being indicative of a time protocol of the time protocol message. The method further comprises at least one of the (Continued)

500

Transmit to a wireless network a radio device request message requesting establishment of a PDU session between the radio device and the wireless network, the radio device request message being indicative of a time protocol of the time protocol message — 502

504A — Receive, from the first station, the time protocol message

504B — Receive, from the wireless network, the time protocol message in the PDU session 506A — Transmit, to the wireless network, the time protocol message including an ingress timestamp according to the time protocol in the PDU session 506B — Send, to the second station, the time protocol message including an egress timestamp according to the time protocol steps of receiving from and transmitting to the at least one base station (400) of the wireless network (900) the time protocol message according to a Quality of Service, QoS, flow for transporting the time protocol message in the wireless network (900). The QoS flow is unambiguously or uniquely associated with at least one of the PDU session and the time protocol.

28 Claims, 12 Drawing Sheets

(56)                 References Cited

U.S. PATENT DOCUMENTS

| | | | | |
|---|---|---|---|---|
| 2012/0120821 | A1 | 5/2012 | Kazmi et al. | |
| 2014/0355574 | A1 | 12/2014 | Turtinen et al. | |
| 2020/0259896 | A1* | 8/2020 | Sachs | H04L 63/0428 |
| 2020/0267785 | A1* | 8/2020 | Talebi Fard | H04L 45/04 |
| 2020/0322908 | A1 | 10/2020 | Prakash et al. | |
| 2021/0007160 | A1* | 1/2021 | Sivasiva Ganesan | |
| | | | | H04W 8/005 |
| 2021/0243771 | A1* | 8/2021 | Mannweiler | H04W 24/02 |
| 2021/0400610 | A1* | 12/2021 | Aijaz | H04L 7/0012 |
| 2022/0021624 | A1* | 1/2022 | Sachs | H04L 47/28 |
| 2022/0217794 | A1* | 7/2022 | Miklós | H04W 76/15 |

FOREIGN PATENT DOCUMENTS

| | | | |
|---|---|---|---|
| WO | 2020183014 | A1 | 9/2020 |
| WO | 2020201830 | A1 | 10/2020 |
| WO | 2021066730 | A1 | 4/2021 |
| WO | 2021066732 | A1 | 4/2021 |
| WO | 2021181363 | A1 | 9/2021 |
| WO | 2021198070 | A1 | 10/2021 |

OTHER PUBLICATIONS

3rd Generation Partnership Project, "3rd Generation Partnership Project; Technical Specification Group Services and System Aspects; Study on enhancement of 5G System (5GS) for vertical and Local Area Network (LAN) services (Release 16)", Technical Report, 3GPP TR 23.734 V16.1.0, Mar. 2019, pp. 1-111, 3GPP.

3rd Generation Partnership Project, "Annex A (normative): Test Cases (Release 16)", Annex A to 3GPP TS 38.133 V16.3.0, Mar. 2020, pp. 245-663, 3GPP.

Intel, "On the Usage of rateRatio, one-step vs two-step sync operation and dedicated QoS Flow", SA WG2 Meeting #S2-134, Sapporo, Japan, Jun. 24-28, 2019, pp. 1-6, S2-1908317, 3GPP.

Ericsson, "Analysis of Time Synchronization Accuracy over Uu Interface", TSG RAN WG1 Ad-Hoc Meeting 1901, Taipei, Taiwan, Jan. 21-25, 2019, pp. 1-6, Tdoc R1-1901353, 3GPP.

Ericsson, "Clock Accuracy Realization at UE", TSG-RAN WG2 #104, Spokane, USA, Nov. 12-16, 2018, pp. 1-6, Tdoc R2-1817173, 3GPP.

Nokia, et al., "Discussion on the RAN2 LS on TSN requirements evaluation", TSG RAN WG1 Meeting #95, Spokane, US, Nov. 12-16, 2018, pp. 1-13, R1-1813120, 3GPP.

Huawei, et al., "Disussion on latency and time synchronization accuracy in Rel-16", TSG RAN WG1 Meeting #95, Spokane, USA, Nov. 12-16, 2018, pp. 1-12, R1-1812228, 3GPP.

Ericsson, "SIB and RRC-unicast delivery in reference time provisioning", TSG-RAN WG2 #105bis, Xi'an, China, Apr. 8-12, 2019, pp. 1-8, Tdoc R2-1904041, 3GPP.

Ericsson, "Analysis of Time Synchronization Accuracy over Uu Interface", TSG RAN WG1 Ad-Hoc Meeting 1901, Taipei, Taiwan, Jan. 21-25, 2019, pp. 1-5, Tdoc R1-1900181, 3GPP.

Ericsson, "On Downlink Delay Compensation", TSG-RAN WG2 #107bis, Chongqing, China, Oct. 14-18, 2019, pp. 1-3, Tdoc R2-1912549, 3GPP.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.4.0, Mar. 2020, pp. 1-430, 3GPP.

3rd Generation Partnership Project, "3rd Generation Partnership Project; Technical Specification Group Radio Access Network; NR; Requirements for support of radio resource management (Release 16)", Technical Specification, 3GPP TS 38.133 V16.0.0, Jun. 2019, pp. 1-999, 3GPP.

Ericsson, "Enhancements for support of time synchronization", TSG-RAN WG2 #111e, Electronic meeting, Aug. 17-28, 2020, pp. 1-5, Tdoc R2-2006701, 3GPP.

Mahmood, A. et al., "Time Synchronization in 5G Wireless Edge: Requirements and Solutions for Critical-MTC", Pre-print in IEEE Communications Magazine, obtained Jun. 20, 2019, pp. 1-8, obtained from https://www.researchgate.net/publication/333842214.

3rd Generation Partnership Project, "3rd Generation Partnership Project; Technical Specification Group Radio Access Netowrk; NR; Requirements for support of radio resource management (Release 16)", Technical Specification, 3GPP TS 38.133 V16.3.0, Mar. 2020, pp. 1-1169, 3GPP.

3rd Generation Partnership Project, "5G; NR; Radio Resource Control (RRC); Protocol specification", Technical Specification, ETSI TS 138 331 V15.6.0, Jul. 2019, pp. 1-514, ETSI.

3rd Generation Partnership Project, "3rd Generation Partnership Project; Technical Specification Group Radio Access Network; NR; Radio Resource Control (RRC) protocol specification (Release 15)", 3GPP TS 38.331 V15.6.0, Jun. 2019, pp. 1-519, 3GPP, France.

* cited by examiner

100

200

300

400

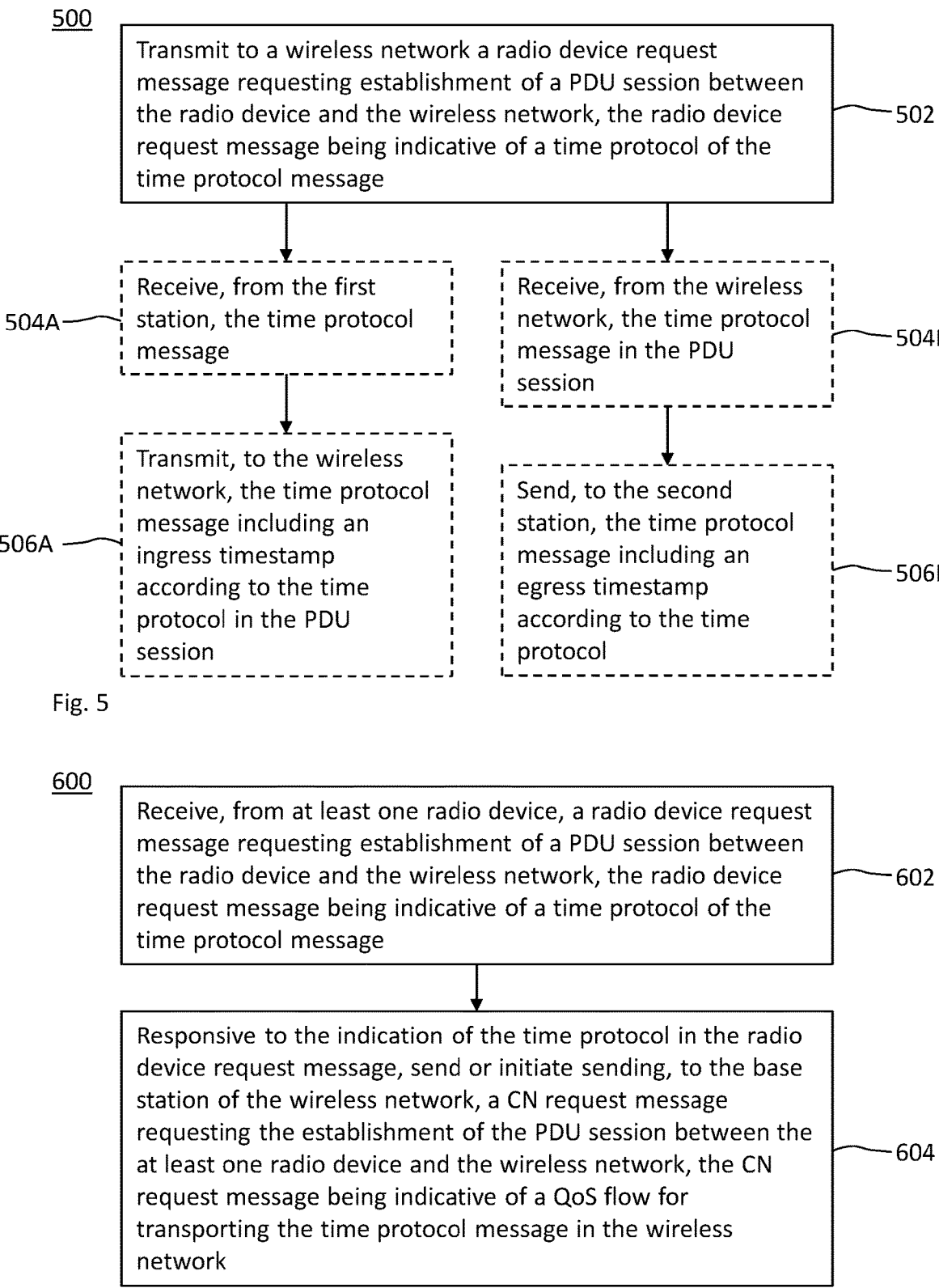

500

Transmit to a wireless network a radio device request message requesting establishment of a PDU session between the radio device and the wireless network, the radio device request message being indicative of a time protocol of the time protocol message — 502

504A — Receive, from the first station, the time protocol message

Receive, from the wireless network, the time protocol message in the PDU session — 504B 506A — Transmit, to the wireless network, the time protocol message including an ingress timestamp according to the time protocol in the PDU session Send, to the second station, the time protocol message including an egress timestamp according to the time protocol — 506B

Receive, from at least one radio device, a radio device request message requesting establishment of a PDU session between the radio device and the wireless network, the radio device request message being indicative of a time protocol of the time protocol message — 602

Responsive to the indication of the time protocol in the radio device request message, send or initiate sending, to the base station of the wireless network, a CN request message requesting the establishment of the PDU session between the at least one radio device and the wireless network, the CN request message being indicative of a QoS flow for transporting the time protocol message in the wireless network — 604

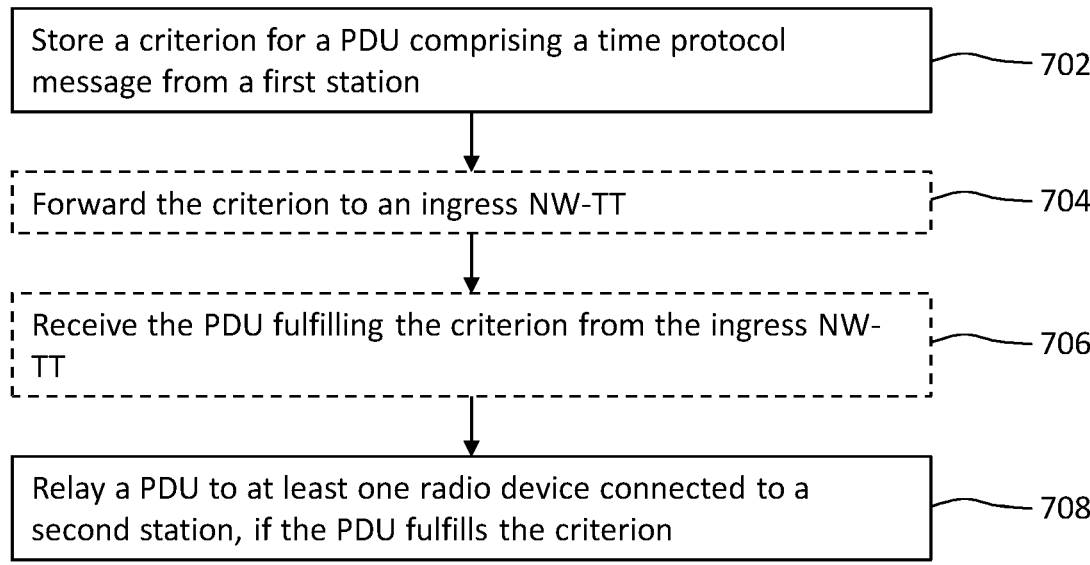

| Store a criterion for a PDU comprising a time protocol message from a first station | —— 702 |

| Forward the criterion to an ingress NW-TT | —— 704 |

| Receive the PDU fulfilling the criterion from the ingress NW-TT | —— 706 |

| Relay a PDU to at least one radio device connected to a second station, if the PDU fulfills the criterion | —— 708 |

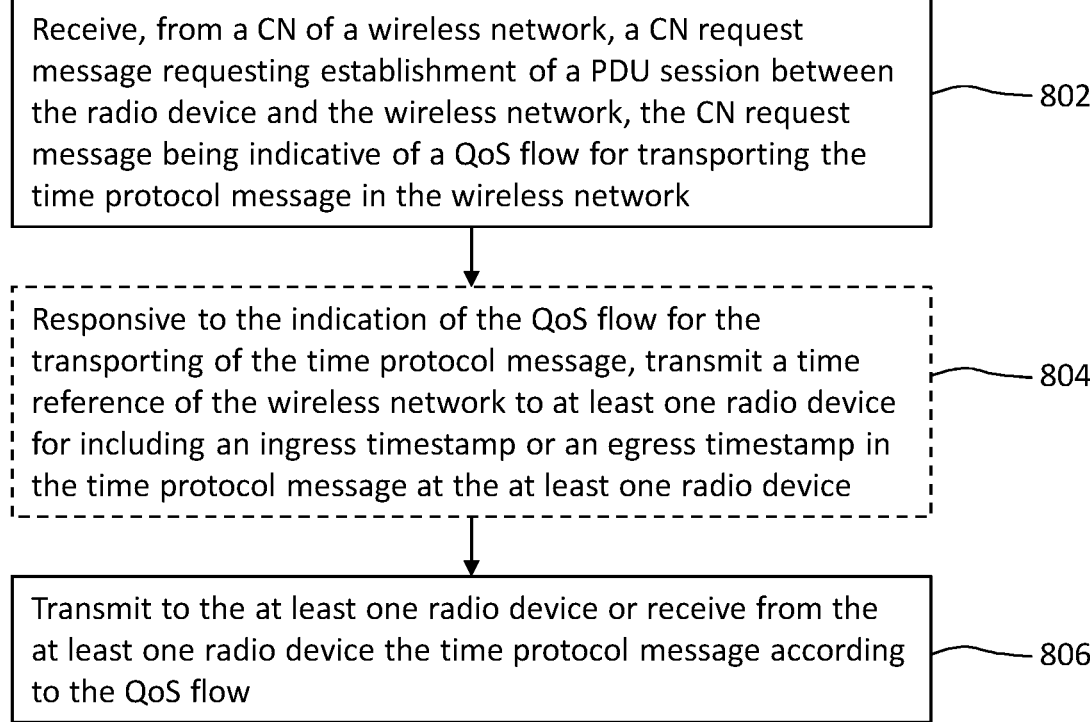

| Receive, from a CN of a wireless network, a CN request message requesting establishment of a PDU session between the radio device and the wireless network, the CN request message being indicative of a QoS flow for transporting the time protocol message in the wireless network | —— 802 |

| Responsive to the indication of the QoS flow for the transporting of the time protocol message, transmit a time reference of the wireless network to at least one radio device for including an ingress timestamp or an egress timestamp in the time protocol message at the at least one radio device | —— 804 |

| Transmit to the at least one radio device or receive from the at least one radio device the time protocol message according to the QoS flow | —— 806 |

TECHNIQUE FOR TRANSPORTING A TIME PROTOCOL MESSAGE FOR TIME-SENSITIVE NETWORKING

TECHNICAL FIELD

The present disclosure relates to a technique for transporting a time protocol message for time-sensitive networking. More specifically, and without limitation, methods and devices are provided for transporting a time protocol message for time-sensitive networking from a first station to a second station through a wireless network including at least one radio device wirelessly connected to the wireless network.

BACKGROUND

Packet-switched networks per se, especially without a centralized scheduler such as Ethernet, have no constraints on end-to-end delay or synchronization precision. The Time-Sensitive Networking (TSN) task group of the IEEE 802.1 working group defines extensions for Ethernet to control the time of transport of messages.

Fifth Generation New Radio (5G NR) according to the Third Generation Partnership Project (3GPP) is to support TSN. That is, a Fifth Generation System (5G System or 5GS) can be integrated as a time-aware system or TSN bridge within a TSN network, e.g. an Ethernet-based TSN network. Use cases for such a system include factory automation networking or any synchronized coordination.

While an existing 5GS can be connected with a TSN network through a TSN translator, the existing 5GS serves a diversity of applications which do not provide essential functions for TSN such as distributing a grandmaster clock to TSN end stations.

SUMMARY

Accordingly, there is a need for technique that allows establishing a time base throughout a system that comprises a wireless network. Alternatively or more specifically, there is a need for a technique that allows distributing a clock for TSN in a system comprising a wireless network.

According to first aspect, a method of transporting a time protocol message for time-sensitive networking (TSN) from a first station to a second station through a wireless network including at least one radio device wirelessly connected to at least one base station of the wireless network is provided. The method may be performed by at least one or each of the at least one radio device. The method comprises or initiates a step of transmitting to the wireless network a radio device request message requesting establishment of a packet data unit (PDU) session between the radio device and the wireless network. The radio device request message is indicative of a time protocol of the time protocol message.

The method may further comprise or initiate a step of receiving from and/or transmitting to the at least one base station of the wireless network the time protocol message according to a Quality of Service (QoS) flow for transporting the time protocol message in the wireless network. The QoS flow may be unambiguously or uniquely associated with the PDU session and/or with the time protocol.

Embodiments of the technique can, based on (e.g., responsive to) the indication of the time protocol in the radio device request message, allocate resources of the wireless network and/or trigger processes in the wireless network. The allocated resources may have an upper limit on a delay of the transport. Alternatively or in addition, the triggered processes may include timestamps in the time protocol message (e.g., at ingress and/or egress to the wireless network) and/or may evaluate and/or correct in timestamps the time protocol message.

For example, the wireless network can, based on the time protocol indicated in the radio device request message, allocate resources specifically for the time protocol message and/or trigger processes specifically for the time protocol message by allocating a specific PDU session in response to the radio device request. The specific PDU session may be associated with a specific Quality of Service flow. Based on the specific PDU session and/or the specific Quality of Service flow, components (e.g., nodes or entities) of the wireless network may be triggered to perform the processes specifically for the time protocol message. For example, the wireless network can, based on the time protocol indicated in the radio device request message, distribute a clock from the first station to the second station through the wireless network by means of the time protocol message.

The first method aspect may be performed by the radio device (e.g., a UE) operating within the context of the wireless network (e.g., a 5GS) serving as a time-aware bridge and/or supporting the first and second stations (e.g., end stations) requiring the use of one or more TSN grandmaster (GM) clocks. Embodiments of the technique can ensure support for distribution of these TSN GM clocks using 5GS signaling resources.

The technique can be implemented for or applied to any one of at least two basic use cases. In a first use case, the first station (e.g., a TSN GM clock source) is located at an end station reachable through a network-side TSN translator (NW-TT). In a second use case, the first station (e.g., a TSN GM clock source) is located at an end station reachable through a device-side TSN translator (DS-TT).

Any aspect of the technique may be implemented for TSN grandmaster clock distribution. To this end, any embodiment may perform any subset of signaling events disclosed herein.

Embodiments of the technique may be implemented for New Radio (NR) and/or Time-Sensitive Networking (TSN). The first station may provide a grandmaster clock (GM clock) for the clock distribution and/or for time synchronization.

Processes triggered by the indication of the time protocol (e.g., a generic Precision Time Protocol or gPTP) may comprise time stamping.

The time protocol may be transported in the wireless network in the PDU session by means of a PDU, e.g., an Ethernet PDU.

The technique may be implemented for any one of the two key TSN GM clock distribution use cases (i.e., the first and second uses cases) to ensure the identification of and/or support for all the functions to be performed by the different 5GS nodes involved in an end-to-end TSN GM clock distribution path (e.g., from the first station to the second station).

The first method aspect may, alternatively or in addition, comprise any of the features and/or steps disclosed in the list of claims, e.g., the claims 1 to 8. Alternatively or in addition, the first method aspect may comprise any of the features and/or steps disclosed for another aspect in the list of claims or any step or feature corresponding to such a disclosure for the other aspect, e.g., according to the claims 9 to 23.

As to a second method aspect, a method of transporting a time protocol message for time-sensitive networking (TSN) from a first station to a second station through a wireless network including at least one radio device wirelessly connected to a base station of the wireless network is provided. The method may be performed by a core network (CN) of the wireless network, e.g., a core network node such as a Session Management Function (SMF). The method comprises or initiates a step of receiving, from the at least one radio device, a radio device request message requesting establishment of a packet data unit (PDU) session between the radio device and the wireless network. The radio device request message is indicative of a time protocol of the time protocol message. The method further comprises or initiates a step of sending or initiating to send, responsive to the indication of the time protocol in the radio device request message, to the base station of the wireless network, a CN request message requesting the establishment of the PDU session between the at least one radio device and the wireless network. The CN request message is indicative of a Quality of Service (QoS) flow for transporting the time protocol message in the wireless network.

The QoS flow may be unambiguously or uniquely (e.g., within the wireless network) associated with the PDU session and/or the time protocol.

The second method aspect may further comprise any feature and any step disclosed in the context of the first method aspect, or a feature or step corresponding thereto, e.g., a receiver counterpart to a transmitter feature or step.

The second method aspect may, alternatively or in addition, comprise any of the features and/or steps disclosed in the list of claims, e.g., the claims 9 to 15. Alternatively or in addition, the second method aspect may comprise any of the features and/or steps disclosed for another aspect in the list of claims or any step or feature corresponding to such a disclosure for the other aspect, e.g., according to the claims 1 to 8 and 16 to 23.

As to a third method aspect, a method of transporting a time protocol message for time-sensitive networking (TSN) from a first station to a second station through a wireless network including at least one radio device wirelessly connected to the wireless network is provided. The method may be performed by a gateway or a user plane function (UPF) of the wireless network. The method comprises or initiates a step of storing a criterion for a PDU comprising the time protocol message from the first station. The method further comprises or initiates a step of relaying a PDU to the at least one radio device connected to the second station (920), if the PDU fulfills the criterion.

The third method aspect may further comprise any feature and any step disclosed in the context of the first or second method aspect, or a feature or step corresponding thereto, e.g., a receiver counterpart to a transmitter feature or step.

The third method aspect may, alternatively or in addition, comprise any of the features and/or steps disclosed in the list of claims, e.g., the claims 16 to 20. Alternatively or in addition, the third method aspect may comprise any of the features and/or steps disclosed for another aspect in the list of claims or any step or feature corresponding to such a disclosure for the other aspect, e.g., according to the claims 1 to 15 and 21 to 23.

As to a fourth method aspect, a method of transporting a time protocol message for time-sensitive networking (TSN) from a first station to a second station through a wireless network including at least one radio device wirelessly connected to at least one base station of the wireless network is provided. The method may be performed by any one or each of the at least one base station. The method comprises or initiates a step of receiving, from a core network (CN, e.g. a CN node or the SMF) of the wireless network, a CN request message requesting establishment of a packet data unit (PDU) session between the radio device and the wireless network. The CN request message is indicative of a Quality of Service (QoS) flow for transporting the time protocol message in the wireless network. The method further comprises or initiates a step of transmitting to the at least one radio device and/or receiving from the at least one radio device the time protocol message according to the QoS flow.

The fourth method aspect may further comprise any feature and any step disclosed in the context of the first, second or third method aspect, or a feature or step corresponding thereto, e.g., a receiver counterpart to a transmitter feature or step.

The fourth method aspect may, alternatively or in addition, comprise any of the features and/or steps disclosed in the list of claims, e.g., the claims 21 to 23. Alternatively or in addition, the fourth method aspect may comprise any of the features and/or steps disclosed for another aspect in the list of claims or any step or feature corresponding to such a disclosure for the other aspect, e.g., according to the claims 1 to 20.

In any aspect, the at least one radio device, the base station, the SMF, and the UPF may form, or may be part of, the wireless network (i.e., a radio network), e.g., according to the Third Generation Partnership Project (3GPP) or according to the standard family IEEE 802.11 (Wi-Fi). The first and fourth method aspects may be performed by one or more embodiments of the radio device and the base station, respectively, in the radio network. The second and third method aspects may be performed by one or more embodiments of the SMF and the UPF, respectively, in the radio network.

The radio network may comprise a radio access network (RAN). The RAN may comprise one or more embodiments of the base stations. Alternatively or in addition, the radio network may be a vehicular, ad hoc and/or mesh network comprising two or more radio devices, e.g., acting as the transmitting and receiving stations.

The radio network may comprise a core network (CN). The CN may comprise one or more embodiments of the SMF and the UMF.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations.

The base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of any one of the method aspects disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device configured to perform any one of the steps of the first method aspect is provided. The device may be embodied by a radio device (e.g., a UE).

As to a second device aspect, a device configured to perform any one of the steps of the second method aspect is provided. The device may be embodied by a CN node (e.g., an SMF).

As to a third device aspect, a device configured to perform any one of the steps of the third method aspect is provided. The device may be embodied by a UPF or gateway.

As to a fourth device aspect, a device configured to perform any one of the steps of the fourth method aspect is provided. The device may be embodied by a base station (e.g., a gNB).

Each or any one of the devices may comprise processing circuitry (e.g., at least one processor and a memory). Said memory may comprise instructions executable by said processing circuitry (e.g., the at least one processor) whereby the respective device is operative to perform any one of the steps of the respective method aspect.

As to a further aspect, a wireless network is provided. The wireless network comprises at least one embodiment of each of the first, second, third and fourth devices.

As to a still further aspect, a TSN system is provided. The TSN system comprises a network configured for TSN, the network comprising at least one embodiment of the wireless network.

As to a still further aspect a communication system including a host computer is provided. The host computer comprises a processing circuitry configured to provide user data. The host computer further comprises a communication interface configured to forward user data to a cellular network (e.g., the RAN and/or the base station) for transmission to a UE. A processing circuitry of the cellular network is configured to execute any one of the steps of the second and/or third and/or fourth method aspects. The UE comprises a radio interface and processing circuitry, which is configured to execute any one of the steps of the first method aspect.

The communication system may further include the UE. Alternatively, or in addition, the cellular network may further include one or more base stations configured for radio communication with the UE and/or to provide a data link between the UE and the host computer using the first and/or fourth method aspects.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the base station, the SMF, the UPF, the wireless network, the TSN system, and the communication system or any node or station for embodying the technique may further include any feature disclosed in the context of any one of the method aspects, and vice versa. Particularly, any one of the units and modules disclosed herein may be configured to perform or initiate one or more of the steps of the method aspects.

BRIEF DESCRIPTION OF THE DRAWINGS

Further details of embodiments of the technique are described with reference to the enclosed drawings, wherein:

FIG. 5 schematically illustrates a flowchart for a method embodiment for transporting a time protocol message for TSN, which may be implementable by the device of FIG. 1;

FIG. 6 schematically illustrates a flowchart for a method embodiment for transporting a time protocol message for TSN, which may be implementable by the device of FIG. 2;

FIG. 7 schematically illustrates a flowchart for a method embodiment for transporting a time protocol message for TSN, which may be implementable by the device of FIG. 3;

FIG. 8 schematically illustrates a flowchart for a method embodiment for transporting a time protocol message for TSN, which may be implementable by the device of FIG. 4;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Wireless Local Area Network (WLAN) implementation according to the standard family IEEE 802.11, it is readily apparent that the technique described herein may also be implemented for any other radio communication technique, including a New Radio (NR) or 5G implementation, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
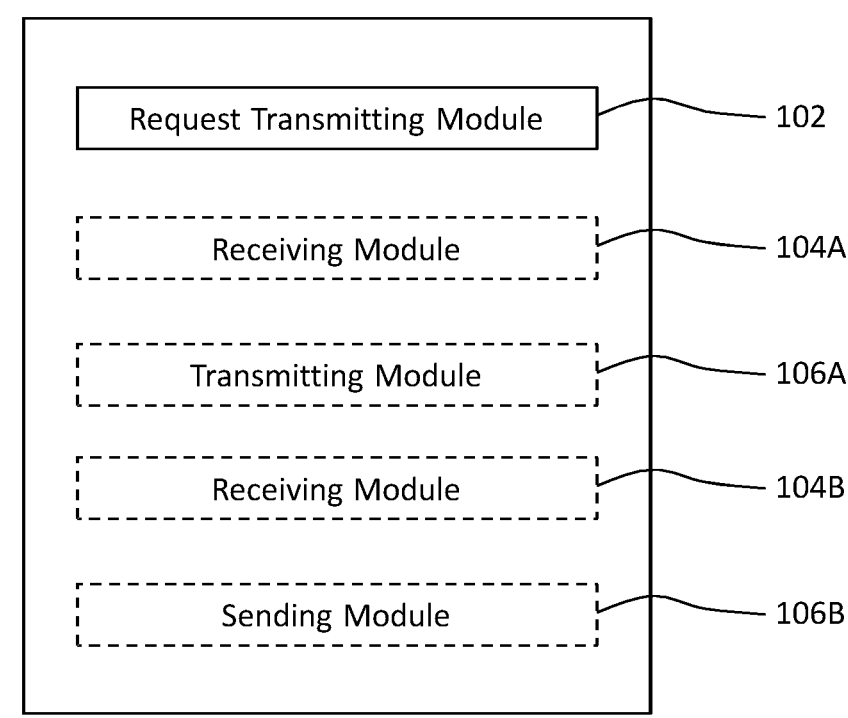
FIG. 1 shows a schematic block diagram of a radio device embodiment of a device for transporting a time protocol message for TSN.

FIG. 1 schematically illustrates a block diagram of an embodiment of a device for transporting a time protocol message for time-sensitive networking (TSN) from a first station to a second station through a wireless network including at least one radio device wirelessly connected to the wireless network. The device is generically referred to by reference sign 100. The device 100 may be embodied by any one or each of the at least one radio device.

The device 100 comprises a request transmitting module 102 that transmits to the wireless network a radio device request message requesting establishment of a packet data unit, PDU, session between the radio device and the wireless network, the radio device request message being indicative of a time protocol of the time protocol message.

The device 100 may comprise any feature of or a module for performing any step of the first method aspect and/or of any one of the listed claims 1 to 8.

Optionally, the device 100 comprises a receiving module 104A that performs the step 504A of the first method aspect and/or the listed claims. Alternatively or in addition, the device 100 comprises a transmitting module 106A that performs the step 506A of the first method aspect and/or the listed claims. Alternatively or in addition, the device 100 comprises a receiving module 104B that performs the step 504B of the first method aspect and/or the listed claims. Alternatively or in addition, the device 100 comprises a sending module 106B that performs the step 506B of the first method aspect and/or the listed claims.

Any of the modules of the device 100 may be implemented by units configured to provide the corresponding functionality.

Figure 2:
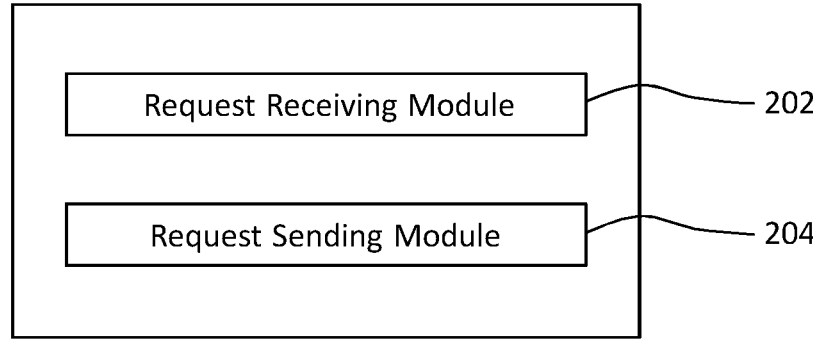
FIG. 2 shows a schematic block diagram of a session management function embodiment of a device for transporting a time protocol message for TSN.

FIG. 2 schematically illustrates a block diagram of an embodiment of a device for transporting a time protocol message for time-sensitive networking (TSN) from a first station to a second station through a wireless network including at least one radio device wirelessly connected to the wireless network. The device is generically referred to by reference sign 200. The device 200 may be embodied by any node of the CN.

The device 200 comprises a request receiving module 202 that receives, from the at least one radio device, a radio device request message requesting establishment of a packet data unit, PDU, session between the radio device and the wireless network, the radio device request message being indicative of a time protocol of the time protocol message. The device 200 further comprises a request sending module 204 that, responsive to the indication of the time protocol in the radio device request message, sends or initiates sending, to the base station of the wireless network, a CN request message requesting the establishment of the PDU session between the at least one radio device and the wireless network, the CN request message being indicative of a Quality of Service, QoS, flow for transporting the time protocol message in the wireless network.

The device 200 may comprise any feature of or a module for performing any step of the second method aspect and/or of any one of the listed claims 9 to 15.

Any of the modules of the device 200 may be implemented by units configured to provide the corresponding functionality.

Figure 3:
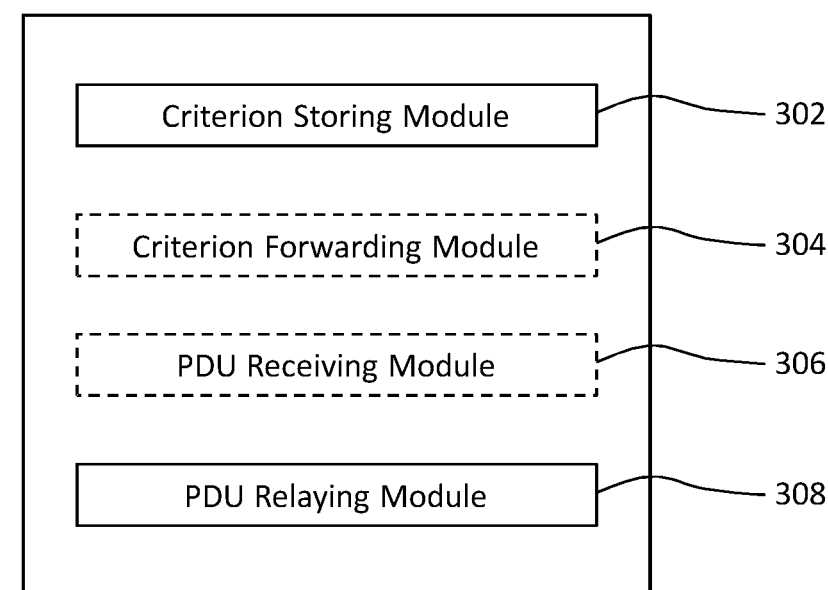
FIG. 3 shows a schematic block diagram of a user plane function embodiment of a device for transporting a time protocol message for TSN.

FIG. 3 schematically illustrates a block diagram of an embodiment of a device for transporting a time protocol message for time-sensitive networking (TSN) from a first station to a second station through a wireless network including at least one radio device wirelessly connected to the wireless network. The device is generically referred to by reference sign 300. The device 300 may be embodied by a UPF of the wireless network.

The device 300 comprises a request receiving module 302 that stores a criterion for a PDU comprising the time protocol message from the first station. The device 300 further comprises a PDU relaying module 308 that relays a PDU to the at least one radio device connected to the second station, if (e.g., only if) the PDU fulfills the criterion.

The device 300 may comprise any feature of or a module for performing any step of the third method aspect and/or of any one of the listed claims 16 to 20.

Optionally, the device 300 comprises a criterion forwarding module 304 that performs the step 704 of the third method aspect and/or of the listed claims. Alternatively or in addition, the device 300 comprises a PDU receiving module 306 that performs the step 706 of the third method aspect and/or of the listed claims.

Any of the modules of the device 300 may be implemented by units configured to provide the corresponding functionality.

Figure 4:
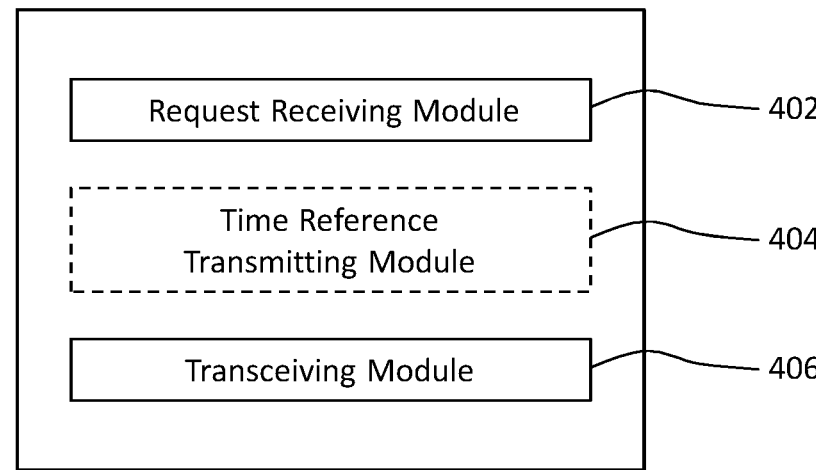
FIG. 4 shows a schematic block diagram of a base station embodiment of a device for transporting a time protocol message for TSN.

FIG. 4 schematically illustrates a block diagram of an embodiment of a device for transporting a time protocol message for time-sensitive networking (TSN) from a first station to a second station through a wireless network including at least one radio device wirelessly connected to the wireless network. The device is generically referred to by reference sign 400. The device 400 may be embodied by a base station of the wireless network.

The device 400 comprises a request receiving module 402 that receives, from a CN of the wireless network, a CN request message requesting establishment of a packet data unit, PDU, session between the radio device and the wireless network, the CN request message being indicative of a Quality of Service, QoS, flow for transporting the time protocol message in the wireless network.

The device 400 further comprises a transceiving module 406 that transmits to the at least one radio device and/or receives from the at least one radio device the time protocol message according to the QoS flow.

The device 400 may comprise any feature of or a module for performing any step of the fourth method aspect and/or of any one of the listed claims 21 to 23.

Optionally, the device 400 comprises a time reference transmitting module 404 that performs the step 804 of the fourth method aspect and/or of the listed claims.

Any of the modules of the device 400 may be implemented by units configured to provide the corresponding functionality.

The device 100 may also be referred to as a radio device, or may be embodied by the at least one radio device. The radio device 100 and the base station 400 may be in direct radio communication. The base station may be embodied by the device 400.

Each of FIGS. 5 to 8 schematically illustrates a block diagram of an embodiment of the first method aspect (i.e., method 500), the second method aspect (i.e., method 600), the third method aspect (i.e., method 700), and the fourth method aspect (i.e., the method 800), respectively.

As shown in FIG. 5, the method 500 of transporting a time protocol message for time-sensitive networking (TSN) from a first station to a second station through a wireless network including at least one radio device wirelessly connected to at least one base station of the wireless network comprises or initiates a step, performed by at least one or each of the at least one radio device, of transmitting 502 to the wireless network a radio device request message requesting establishment of a packet data unit (PDU) session between the radio device and the wireless network, the radio device request message being indicative of a time protocol of the time protocol message.

The method 500 may further comprise at least one of the steps of receiving 504B from and transmitting 506A to the at least one base station (of the wireless network the time protocol message according to a Quality of Service (QoS) flow for transporting the time protocol message in the wireless network. The QoS flow may be unambiguously or uniquely associated with the PDU session and/or with the time protocol.

The radio device request message may be indicative of the time protocol to be supported (e.g., fulfilled) in the PDU session. The transport of the time protocol message in the PDU session may support the time protocol responsive to the radio device request message being indicative of the time protocol of the time protocol message.

The indication of the time protocol may trigger the wireless network to include an ingress timestamp in the time protocol message upon ingress of the time protocol message at the wireless network.

The indication of the time protocol may trigger the wireless network to include an egress timestamp and/or to perform an egress timestamp and/or to modify the time protocol message to indicate the difference between the ingress and egress timestamps upon egress of the time protocol message at the wireless network.

The method 500 may further comprise or initiate the steps of receiving 504A, from the first station, the time protocol message; and transmitting 506A, to the wireless network, the time protocol message including an ingress timestamp according to the time protocol in the PDU session.

The receiving of the time protocol message from the first station may be the ingress of the time protocol message at the wireless network.

The receiving 504A and the transmitting 506A may be performed by a first radio device of the at least one radio device that is connected to the first station.

The method 500 may further comprise or initiate the steps of receiving 504B, from the wireless network, the time protocol message in the PDU session; and sending 506B, to the second station, the time protocol message including an egress timestamp and/or an indication of the difference between the ingress timestamp and the egress timestamp according to the time protocol.

The receiving 504B and the sending 506B may be performed by a second radio device of the at least one radio device that is connected to the second station.

Reference to a second radio device may or may not require the existence or presence of more than one radio device in the wireless network. The second radio device may be the at least one radio device.

For example, each of the first station and the second station may be connected to the first radio device and the second radio device, respectively (e.g., by wire and/or Ethernet).

The time protocol message may be received from the wireless network or transmitted to the wireless network in a PDU of the PDU session. The PDU may be or may comprise an Internet Protocol (IP) packet.

The step of receiving the time protocol message from the wireless network may comprise receiving a PDU from the wireless network in the PDU session. The received PDU may comprise the time protocol message. Alternatively or in addition, the step of transmitting the time protocol message to the wireless network may comprise transmitting a PDU to the wireless network in the PDU session. The transmitted PDU may comprise the time protocol message.

The step of sending the time protocol message to the second station may comprise a substep of performing an egress timestamp and modifying the time protocol message to indicate the difference between the ingress and egress timestamps. Alternatively or in addition, the step of receiving the time protocol from the first station may comprise a substep of including the ingress timestamp in the time protocol message according to the time protocol.

The radio device request message may comprise a flag that is indicative of the time protocol of the time protocol message.

The flag may be indicative of a requirement that the time protocol be supported, e.g., in the PDU session and/or when transporting the time protocol message in the wireless network. Alternatively or in addition, the flag may distinguish the PDU session supporting the time protocol from a PDU session for user-data transport or best-effort transport. Alternatively or in addition, the flag may distinguish the PDU session fulfilling a precision time protocol (PTP) from a PDU session usable or used for a network time protocol (NTP).

The PDU session may be used exclusively for transporting messages according to the time protocol.

The method 500 may further comprise or initiate a step of determining that the at least one radio device or the wireless network is arranged as a TSN bridge between the first station and the second station. The radio device request message may be transmitted 502 responsive to the determination. Optionally, the determination may comprise determining that the at least one radio device supports connectivity with at least one device-side TSN translator (DS-TT).

The time protocol message may be received 504A from the first station using an ingress DS-TT. Alternatively or in addition, the time protocol message may be sent 506B to the second station using an egress DS-TT.

The ingress DS-TT may be connected to both the first radio device and (e.g., directly or through one or more TSN bridges) the first station. The ingress DS-TT may be interposed between the first radio device and the first station. Alternatively or in addition, the egress DS-TT may be connected to both the second radio device and (e.g., directly or through one or more TSN bridges) the second station. The egress DS-TT may be interposed between the second radio device and the second station.

The ingress DS-TT may be connected or connectable to the first station. Alternatively or in addition, the egress DS-TT may be connected or connectable to the second station.

The ingress DS-TT may be connected to the first station by a first non-3GPP network and/or by a first wire and/or by a first Ethernet. Alternatively or in addition, the egress DS-TT may be connected to the second station by a second non-3GPP network and/or by a second wire and/or by a second Ethernet. The first non-3GPP network, the wireless network and the second non-3GPP network may form one time-sensitive (or time-aware) network or system.

The at least one radio device may comprise at least one DS-TT. Optionally, the first radio device may comprise the ingress DS-TT and/or the second radio device may comprise the egress DS-TT.

The respective DS-TT may be implemented in an application layer of a protocol stack at the respective radio device.

The ingress DS-TT may perform at least one of the receiving 504A of the time protocol message, the including of the ingress timestamp in the time protocol message, and the transmitting 506A of the time protocol message including the ingress timestamp. Alternatively or in addition, the egress DS-TT may perform at least one of the receiving 504B of the time protocol message, the performing of an egress timestamp, the modifying the time protocol message to include the difference between the ingress and egress timestamps, the including of the egress timestamp in the time protocol message, and the sending 506B of the time protocol message including the difference between the ingress timestamp and egress timestamp.

The first station may be a time source of the time protocol message and/or the TSN.

The first station may generate the time protocol message. The time protocol message may be indicative of the time of generating the time protocol message according to the time source, e.g., a grandmaster clock.

The first station may comprise a TSN grandmaster clock (GM clock) of the TSN.

The second station may comprise at least one of a field device, an Industrial Internet of Things device (IIoT device), a device for machine-type communication (MTC device), an actuator and a sensor.

The wireless network may comprise a cellular telecommunications network. Optionally, the wireless network may comprise a Fifth Generation System (5GS). Alternatively or in addition, the wireless network may comprise a core network (CN). Optionally, the CN may comprise a Fifth Generation Core (5GC). Further alternatively or in addition, the wireless network may comprise a radio access network (RAN). Optionally, the RAN may comprise a Fifth Generation New Radio (5G NR) RAN.

The wireless network may be a cellular telecommunications network according to the Third Generation Partnership Project (3GPP). For example, the wireless network may comprise a Fifth Generation System (5GS). The core network may comprise a Fifth Generation Core (5GC).

The RAN may comprise one or more base stations. At least one or each of the one or more base stations may be configured to provide radio access to the radio device. The radio device may be a user equipment (UE). The base station may provide the radio access according to Fifth Generation New Radio (5G NR). The base station may be a gNodeB (gNB).

In order to wirelessly connect to the wireless network, the UE may perform at least one of the following interactions, which may be collectively referred to as a registration procedure. A first interaction comprises performing a random-access procedure to initiate communication with the gNB. A second interaction comprises setting up a radio resource control (RRC) connection with the gNB. A signaling bearer may be set up at this point. The UE also sends a Registration Request to the 5GC. A third interaction comprises performing a non-access stratum (NAS) level authentication and initiating ciphering for NAS messages with the 5GC. A fourth interaction comprises completing access stratum (AS) security procedure with the gNB. A fifth interaction comprises handle an RRC Reconfiguration from the gNB. A message indicative of the RRC Reconfiguration may set up a default PDU session. The message may add one or more secondary cells.

The wireless network, optionally the CN, may comprise a Session Management Function (SMF) and an Access and Mobility management Function (AMF). The radio device request message may be transmitted 502 through the AMF to the SMF using a non-access stratum (NAS) of the wireless network.

The radio device request message may be further indicative of a type of the PDU session. Optionally, the type may comprise at least one of an Ethernet PDU session and an always-on PDU session.

The wireless network, optionally the RAN, may comprise at least one of a base station 400 and a user plane function (UPF). The time protocol message may be received 504B in a PDU generated by the UPF in the PDU session and/or transmitted by the base station 400 in a Quality of Service (QoS) flow according to the PDU session.

The indication of the time protocol in the radio device request message may determine at least one of the PDU session and the QoS flow.

The time protocol message may be received 504B in the PDU session in a PDU translated for ingress at the wireless network using a network-side TSN translator (ingress NW-TT). Alternatively or in addition, the time protocol message may be transmitted 506A in the PDU session in a PDU translated for egress at the wireless network using a network-side TSN translator (egress NW-TT).

The ingress NW-TT may be connected to both the wireless network (e.g., the UPF) and (e.g., directly or through one or more TSN bridges) the first station. The ingress NW-TT may be interposed between the wireless network (e.g., the UPF) and the first station. Alternatively or in addition, the egress NW-TT may be connected to both the wireless network (e.g., the UPF) and (e.g., directly or through one or more TSN bridges) the second station. The egress NW-TT may be interposed between the wireless network (e.g., the UPF) and the second station.

The ingress NW-TT may be connected or connectable to the first station. Alternatively or in addition, the egress NW-TT may be connected or connectable to the second station.

The ingress NW-TT may be connected to the first station by a first non-3GPP network and/or by a first wire and/or by a first Ethernet. Alternatively or in addition, the egress NW-TT may be connected to the second station by a second non-3GPP network and/or by a second wire and/or by a second Ethernet. The first non-3GPP network, the wireless network and the second non-3GPP network may form one time-sensitive (or time-aware) network or system.

The wireless network, optionally the UPF, may comprise at least one of the ingress NW-TT and the egress NW-TT.

The respective NW-TT may be implemented in an application layer of a protocol stack at the wireless network, optionally at the UPF.

The time protocol message received 504B from the wireless network may include an ingress timestamp. The ingress timestamp may be indicative of a time of ingress of the time protocol message at the wireless network, optionally at the UPF or the ingress NW-TT.

The ingress timestamp in the time protocol message transmitted 504A to the second station may be indicative of a time of ingress of the time protocol message at the first radio device, optionally at the ingress DS-TT. Alternatively or in addition, the difference between the ingress timestamp and the egress timestamp included in the time protocol message sent 506B to the second station and/or the egress timestamp included in the time protocol message sent 506B to the second station may be indicative of a time between the ingress of the time protocol message at the first device, optionally at the ingress DS-TT, and egress of the time protocol message at the second radio device, optionally at the egress DS-TT.

Herein, ingress may relate to the time protocol message arriving at the wireless network, e.g. at the UPF or the ingress NW-TT. Alternatively or in addition, ingress may relate to the time protocol message arriving at the wireless network, e.g., at the first radio device or the ingress DS-TT. Alternatively or in addition, egress may relate to the time protocol message leaving the wireless network, e.g. at the second radio device or the egress DS-TT. Alternatively or in addition, egress may relate to the time protocol message leaving the wireless network, e.g. at the UPF or the egress NW-TT.

The ingress timestamp may be included upon ingress of the protocol message from the first station at the wireless network, e.g., at the UPF or the ingress NW-TT, or at the first radio device or the ingress DS-TT. The difference between the ingress and egress timestamps may be determined and included upon egress of the protocol message at the wireless network to the second station, e.g., at the second radio device or at the egress DS-TT.

The time protocol message may be indicative of the ingress timestamp relative to a time reference of the wireless network. Alternatively or in addition, the time protocol message may be indicative of the egress timestamp relative to a time reference of the wireless network. Further alternatively or in addition, the time protocol message may be indicative of the difference between the ingress and egress timestamps. Optionally, the egress timestamp may be performed relative to a time reference of the wireless network.

The time reference of the wireless network may be based on a global navigation satellite system (GNSS). Alternatively or in addition, the time reference of the wireless network may comprise a 5GS clock information.

The time reference of the wireless network may be independent of the time source of the time protocol message.

A difference between the egress timestamp and the ingress timestamp may represent a residence time of the time protocol message in the wireless network and/or a delay due to sending the time protocol message through the wireless network. A time indicated by the time protocol message may be corrected according to the residence time (e.g., by adding or subtracting the residence time).

The method 500 may further comprise or initiate a step, performed by the at least one radio device, of, responsive to the indication of the time protocol, receiving the time reference of the wireless network from a base station 400 of the wireless network providing the wireless connection.

The method 500 may further comprise or initiate a step, performed by the at least one radio device, of transmitting a capability information message to the base station 400. The capability information message may be indicative of a type of the time reference to be provided by the base station 400.

The type of the time reference may specify an uncertainty of the reference time, e.g., according to 3GPP Release 16 or 3GPP release 17. The capability information message may comprise a UEAssistanceInformation message or a UECapabilityInformation message or a UERadioAccessCapabilityInformation.

The time protocol may comprise a Precision Time Protocol (PTP), optionally a generic or generalized Precision Time Protocol (gPTP).

The time protocol message may be a PTP message (e.g., gPTP message). The time protocol message may be referred to as time protocol signaling, e.g., PTP signaling or gPTP signaling.

At least one of the first station and the second station may be outside of the wireless network and/or in a non-3GPP network.

At least one of the first station and the second station may be an end station of the TSN.

As shown in FIG. 6, the method 600 of transporting a time protocol message for time-sensitive networking (TSN) from a first station to a second station through a wireless network including at least one radio device wirelessly connected to a base station 400 of the wireless network comprises or initiates the steps, performed by a core network (CN) of the wireless network, of receiving 602, from the at least one radio device, a radio device request message requesting establishment of a packet data unit, PDU, session between the radio device and the wireless network, the radio device request message being indicative of a time protocol of the time protocol message; and responsive to the indication of the time protocol in the radio device request message, sending or initiating to send 604, to the base station 400 of the wireless network, a CN request message requesting the establishment of the PDU session between the at least one radio device and the wireless network, the CN request message being indicative of a Quality of Service (QoS) flow for transporting the time protocol message in the wireless network.

The CN request message may be or comprise an N2 PDU session request. The QoS flow may be selected or determined based on the indicated time protocol.

The PDU session may be anchored at the UPF of the wireless network.

The wireless network may comprise at least one NW-TT connected to a UPF of the wireless network. The indication of the time protocol and/or the indication of the QoS flow may trigger the UPF or the NW-TT to include in the time protocol message at least one of an ingress timestamp, an egress timestamp, and a difference between the ingress and egress timestamps.

The wireless network may comprise at least one DS-TT connected to the at least one radio device of the wireless network. The indication of the time protocol and/or the indication of the QoS flow may trigger the radio device or the DS-TT to include in the time protocol message least one of an ingress timestamp, an egress timestamp, and a difference between the ingress and egress timestamps.

The QoS flow may be used exclusively for transporting messages according to the time protocol.

At least one of the PDU session and the QoS flow may be indicated by means of a QoS flow identifier (QFI) or a QoS indicator.

The QoS indicator (QI) may be a 5G QI (5QI).

A predefined or configured table may comprise an entry for the QoS flow used for the transporting of the time protocol message in the wireless network. Optionally, the QFI or QoS indicator may be an index of the table.

The table may be available (e.g., predefined or configured) at one or more of (e.g. at each of) the radio device, the base station, the CN (e.g., the SMF and/or the AMF), and the UPF.

The CN may comprise an AMF and an SMF. The method 600 may be performed by the SMF. The SMF may trigger the AMF to send the CN request message to the base station 400.

The method 600 may further comprise any one of the steps or features of the methods 500, 700 and/or 800, or any step or feature corresponding thereto.

As displayed in FIG. 7, the method 700 of transporting a time protocol message for time-sensitive networking (TSN) from a first station to a second station through a wireless network including at least one radio device wirelessly connected to the wireless network comprises or initiates the steps, performed by a user plane function (UPF) of the wireless network, of storing 702 a criterion for a PDU comprising the time protocol message from the first station; and relaying 708 a PDU to the at least one radio device connected to the second station, if the PDU fulfills the criterion.

The step 702 of storing the criterion may comprise receiving, from a CN of the wireless network, a CN control message that is indicative of the criterion for the PDU comprising the time protocol message according to the time protocol of the TSN.

The CN control message may be or comprise N4 signaling from the CN (e.g., the SMF) to the UPF.

The criterion may comprise at least one of a link layer criterion for at least one link layer field in the PDU; a medium access control (MAC) address in the PDU; and an EtherType field value in the PDU.

The wireless network may comprise an ingress NW-TT connected to the UPF. The method 700 may further comprise or initiate the steps, performed by the UPF, of forwarding 704 the criterion to the ingress NW-TT; and receiving 706 the PDU fulfilling the criterion from the ingress NW-TT.

Fulfilment of the criterion may trigger at least one of the ingress NW-TT and the UPF to include an ingress timestamp in the time protocol message upon ingress of the time protocol message at the wireless network.

The ingress NW-TT may perform at least one of generating the PDU comprising the time protocol message and including the ingress timestamp in the time protocol message.

The method 700 may further comprise any one of the steps or features of the methods 500, 600 and/or 800, or any step or feature corresponding thereto.

As displayed in FIG. 8, the method 800 of transporting a time protocol message for time-sensitive networking (TSN) from a first station to a second station through a wireless network including at least one radio device wirelessly connected to a base station 400 of the wireless network comprises or initiates the steps, performed by the base station 400, of receiving 802, from a CN of the wireless network, a CN request message requesting establishment of a packet data unit, PDU, session between the radio device and the wireless network, the CN request message being indicative of a Quality of Service, QoS, flow for transporting the time protocol message in the wireless network; and transmitting 806 to the at least one radio device or receiving 806 from the at least one radio device the time protocol message according to the QoS flow.

The method 800 may further comprise or initiate the step, performed by the base station 400, of responsive to the indication of the QoS flow for the transporting of the time protocol message, transmitting 804 a time reference of the wireless network to the at least one radio device for including an ingress timestamp or an egress timestamp in the time protocol message or performing an egress timestamp at the at least one radio device.

The method 800 may further comprise or initiate a step, performed by the base station 400, of receiving a capability information message from the at least one radio device. The capability information message may be indicative of a type of the time reference to be provided by the base station 400.

The method 800 may further comprise any one of the steps or features of the methods 500, 600 and/or 700, or any step or feature corresponding thereto.

In any aspect, the technique may be applied to uplink (UL), downlink (DL) or direct communications between radio devices, e.g., device-to-device (D2D) communications or sidelink (SL) communications.

Each of the at least one radio device 100 may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station 400 may be a station providing radio access, may be part of a radio access network (RAN) and/or may be a node connected to the RAN for controlling the radio access. For example, the base station may be an access point, for example a Wi-Fi access point.

Figure 9:
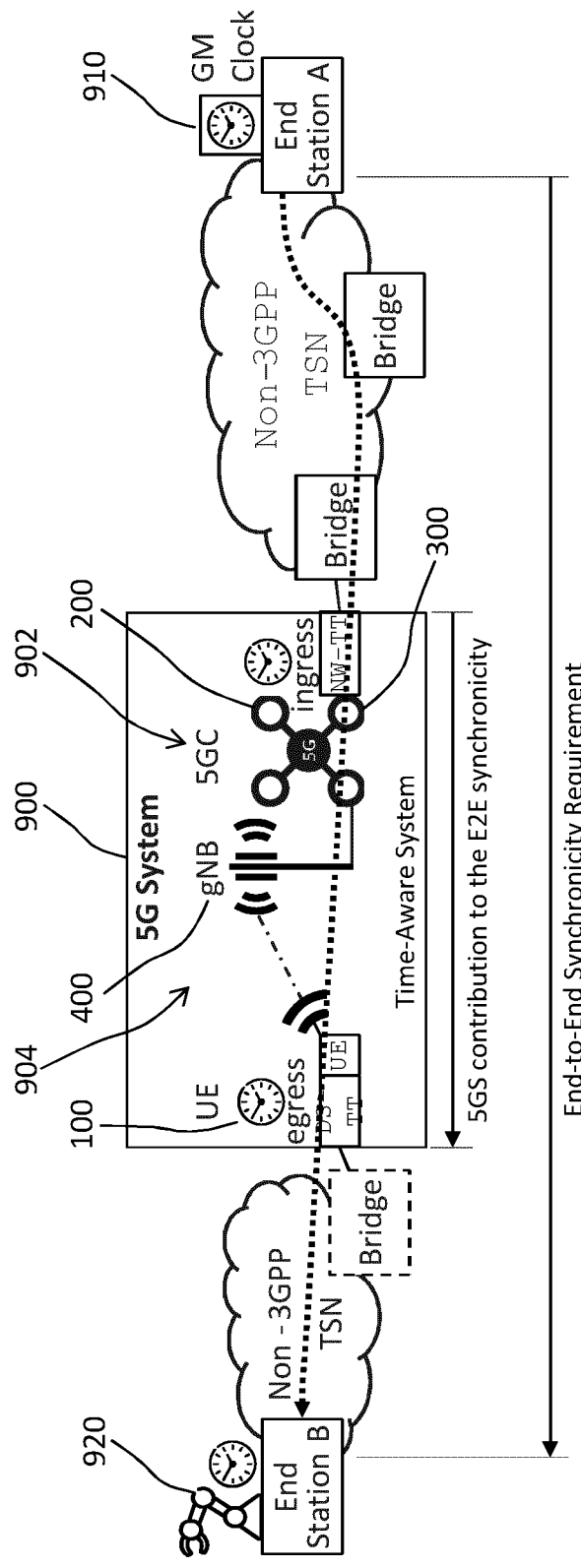
FIG. 9 schematically illustrates an embodiment of a TSN system comprising an embodiment of the wireless network according to a first use case.

FIG. 9 schematically illustrates an embodiment of a TSN system comprising a 5G System embodying the wireless network 900 between the first station 910 and the second station 920. The 5GS 900 comprises a 5GC embodying the CN 902 and a NR RAN embodying the RAN 904.

The TSN system is configured for TSN GM clock distribution from an end station (namely the station 910) reachable through a NW-TT. This case is also referred to as the first use case.

In any embodiment for the first use case, a synchronized 5GS may use time stamps based on a 5G reference time distributed to nodes within the 5GS (e.g., to a user plane function and/or an ingress NW-TT and/or to the radio device and/or an egress DS-TT, optionally as illustrated in FIG. 9). These time stamps may be used to calculate a residence time of the time protocol message (e.g., gPTP signaling and/or a synchronization message) as it passes through the 5GS. Hence, embodiments can allow for TSN GM clock values provided by the time protocol message (e.g., gPTP signaling) to be compensated (e.g., according to the time stamps and/or the calculated residence time).

Figure 10:
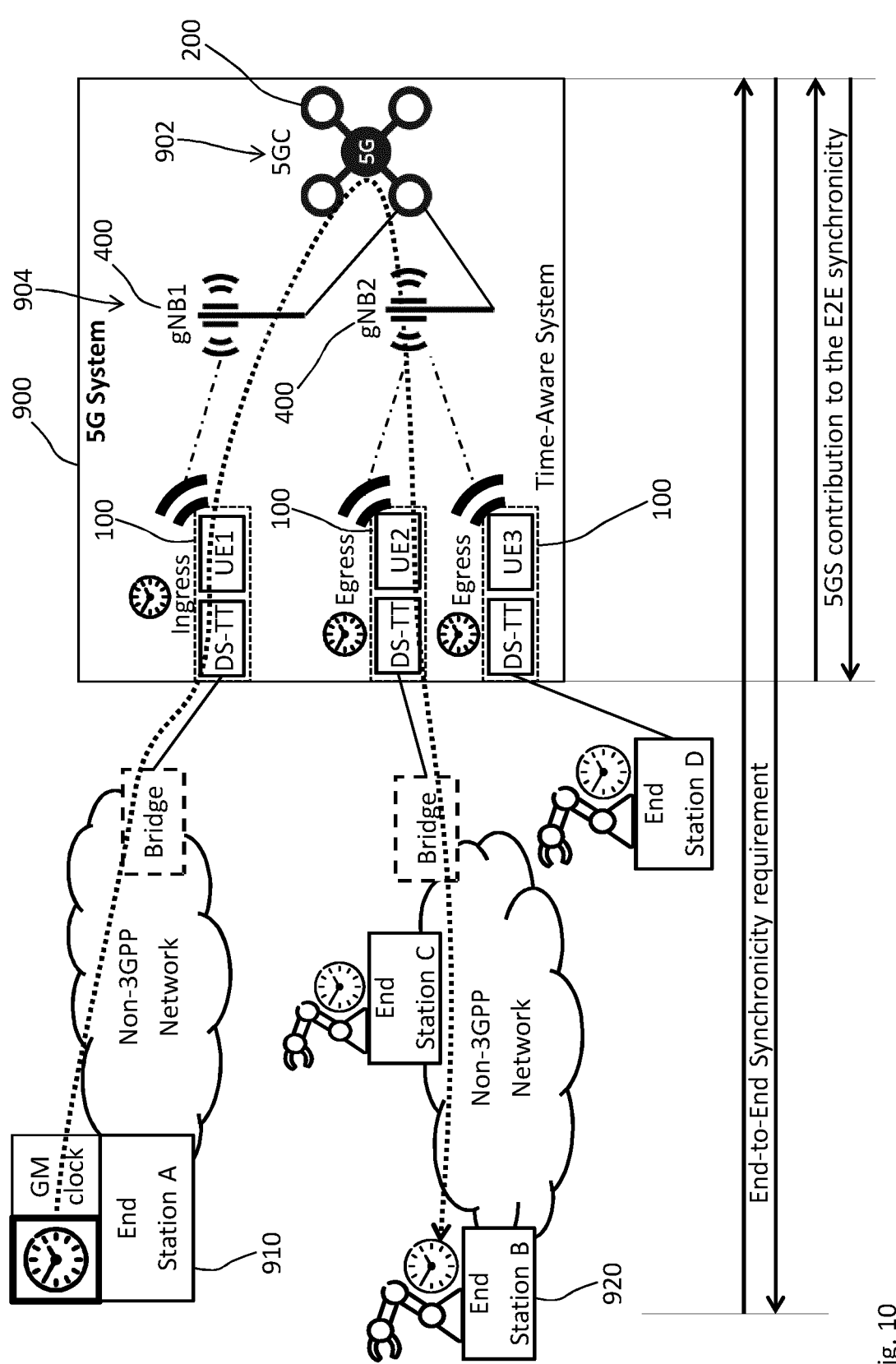
FIG. 10 schematically illustrates an embodiment of a TSN system comprising an embodiment of the wireless network according to a second use case.

FIG. 10 schematically illustrates an embodiment of a TSN system comprising a 5G System embodying the wireless network 900 between the first station 910 and the second station 920. The 5GS 900 comprises a 5GC embodying the CN 902 and a NR RAN embodying the RAN 904.

The TSN system is configured for TSN GM clock distribution from an end station (namely the station 910) reachable through a DS-TT. This case is also referred to as the second use case.

In any embodiment for the second use case, a synchronized 5GS may use time stamps based on a 5G reference time distributed to nodes within the 5GS (e.g., to a first radio device and/or an ingress DS-TT and/or to a second radio device and/or an egress DS-TT, optionally as illustrated in FIG. 10). These time stamps may be used to calculate a residence time of the time protocol message (e.g., gPTP signaling and/or a synchronization message) as it passes through the 5GS, optionally using a path that excludes an NW-TT. Hence, embodiments can allow for TSN GM clock values provided by the time protocol message (e.g., gPTP signaling) to be compensated (e.g., according to the time stamps and/or the calculated residence time).

In any use case, any one of the DS-TTs may be connected to one of the radio devices 100 or may be implemented (e.g., at an application layer) by the respective radio device 100.

In the first use case, the NW-TT may be connected to the CN or the UPF 300 of the wireless network 900 or may be implemented (e.g., at an application layer) by the UPF 300.

Figure 11:
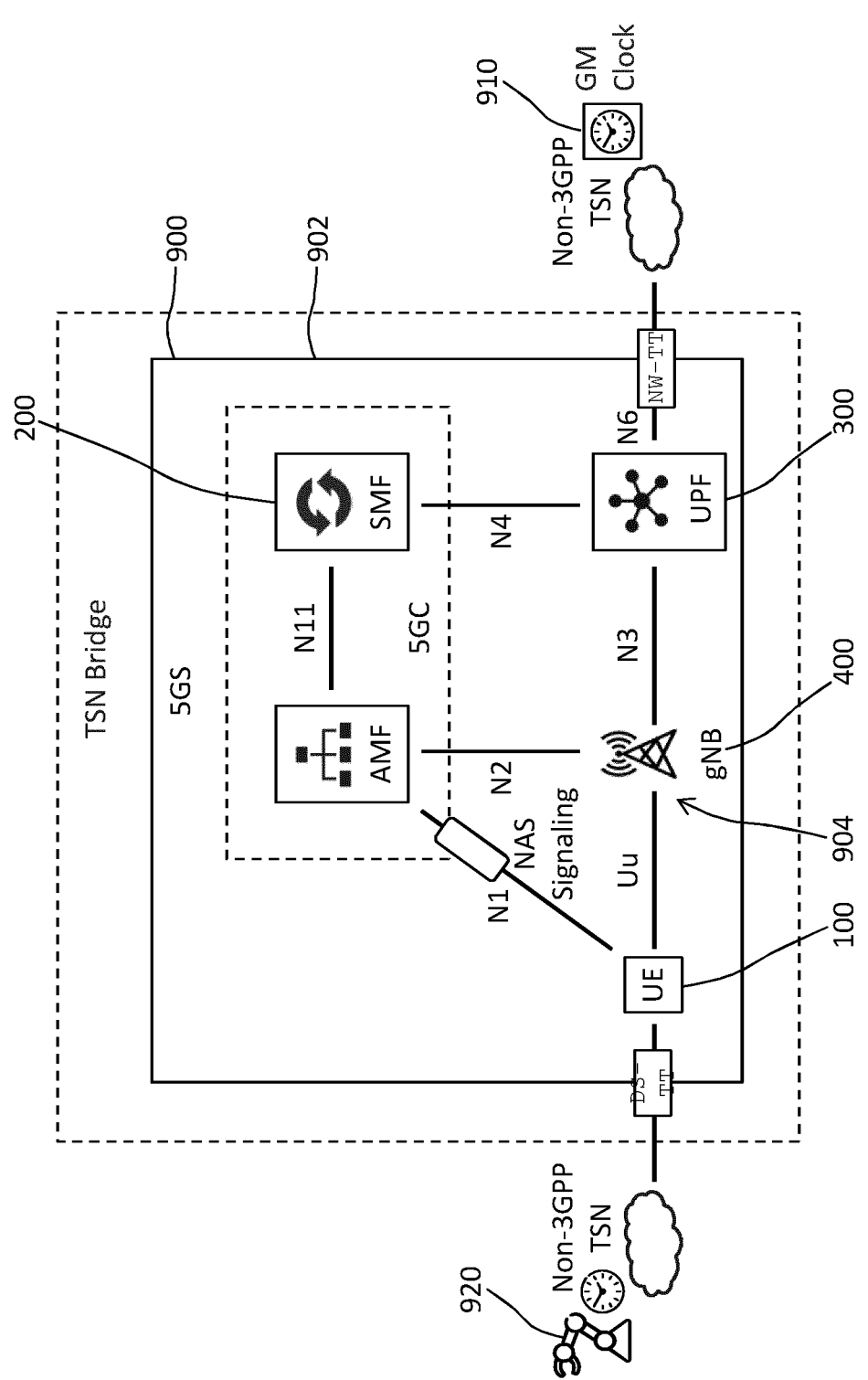
FIG. 11 schematically illustrates an fifth generation embodiment of the wireless network according to the first use case.

FIG. 11 schematically illustrates an 5GS embodiment of the wireless network 900, e.g. for the first use case.

Herein below, the gPTP signaling is described as an embodiment of the time protocol message for concreteness. The technique is not limitation thereto.

In what follows, the first use case is described. The description is combinable with the disclosure of FIG. 9 and/or FIG. 11. While features and steps are described for the TSN system and the wireless network 900, the skilled person understands that each of these features and steps may be associated with or implemented by any one of the devices 100, 200, 300, and 400. Therefore, the below disclosure also discloses features and steps separately for each of the devices 100, 200, 300, and 400 and separately for each of the methods 500, 600, 700 and 800.

The first use case may apply to a TSN GM Clock at an end station reachable through a NW-TT.

For example, a 5G QoS flow is supported within the context of a PDU session and can be used exclusively for sending UE-specific gPTP signaling for the case in which a TSN GM clock is supported by an end station 910 reachable through a NW-TT.

Any one of the methods 500, 600, 700 and 800 may be implemented according to the following step 1: A UE is able to determine that it operates as part of a 5GS that serves as a TSN bridge (e.g. based on UE configuration information or based on the UE determining that it supports connectivity with one or more DS-TTs) and therefore triggers NAS signaling with the SMF to establish a PDU session as an always-on PDU Session of type "Ethernet PDU Session" (e.g. according to sections 5.6.10.2 and 5.6.13 of the 3GPP document TS 23.501, version 16.4.0).

The step 1 may further comprise any one of the following sub-steps.

Sub-Step 1a: A PDU Session Establishment Request is sent from the UE to the SMF (via the Access and Mobility management Function, AMF) and includes a flag indicating support for gPTP signaling is required. The SMF triggers the AMF to send the gNB a N2 PDU Session Request which includes PDU Session ID, QFIs, QoS Profile, CN tunnel Info, PDU Session type etc. A standardized or operator defined 5QI table index or QFI (5G QoS flow ID) value can be the basis for a UE and gNB determining which specific 5G QoS flow is used for gPTP signaling. Within the 5GS, the PDU Session Establishment procedure (e.g. according to the document TS 23.502, version 16.4.0, clause 4.3.2) is used for QoS flow establishment.

Sub-Step 1b: gNB knowledge of a downlink 5G QoS flow used for gPTP signaling allows it to determine that the UE is interested in receiving 5G system clock information in which case it begins periodically providing that UE with 5G system clock information (used by the UE/DS-TT for egress time stamping of gPTP signaling).

Sub-Step 1c: A gNB needs to know what method to use to provide a UE with 5G system clock information (i.e. the basic Rel-16 method already standardized or an enhanced Rel-17 method used for realizing reduced 5G system clock uncertainty). The selected method depends on whether the gNB knows a UE is capable of the enhanced Rel-17 method (method details are FFS) and whether the uncertainty requirements of TSN GM clock values sent to that UE require the use of the enhanced Rel-17 method (i.e. the enhanced Rel-17 method allows for introducing less uncertainty when performing time stamping of gPTP signaling and thereby reduces the uncertainty introduced when measuring the delay experienced when sending TSN GM clocks through the 5GS). A UE can provide the gNB with this information by including a new flag indicating whether or not it supports "enhanced signaling for realizing reduced uncertainty for the 5G system clock" within the UEAssistanceInformation, UECapabilityInformation or the UERadioAccessCapabilityInformation message.

Sub-Step 1d: With multiple UEs triggering NAS signaling that includes a flag indicating support for gPTP signaling is required, a SMF is able to determine the set of downlink 5G QoS flows that support gPTP signaling for which specific attributes may apply (e.g. the 5G system residence time corresponding to such 5G QoS flows may have a maximum value of 10 ms).

Any one of the methods 500, 600, 700 and 800 may be implemented according to the following step 2: An ingress NW-TT receives an Ethernet PDU (from a TSN network) containing gPTP signaling, makes an ingress time stamp and adds it to the Ethernet PDU (e.g. in the Suffix field of a Sync message).

The step 2 may further comprise any one of the following sub-steps.

Sub-Step 2a: A 5G Core Network (e.g. SMF) can inform a UPF about the specific multicast MAC address value and/or EtherType field value (e.g. x88F7) which, if received within an Ethernet PDU, indicates it contains gPTP signaling (or these specific values can be known by default by the UPF application based on information provided by the gPTP signaling specifications i.e. IEEE802.1AS).

Sub-Step 2b: The UPF can relay these values to the NW-TT (or these specific values can be known by default by the NW-TT application based on information provided by the gPTP signaling specifications i.e. IEEE802.1AS).

Sub-Step 2c: The NW-TT relays the timestamped Ethernet PDU to the UPF which then relays it to the set of downlink 5G QoS flows configured for supporting gPTP signaling per Step 1. In this case there are multiple logical ports to which gPTP signaling is to be relayed (i.e. the set of downlink 5G QoS flows configured to support gPTP signaling).

Sub-Step 2d: According to IEEE 802.1AS the Sync and announce and signaling messages shall all make use of a reserved destination multicast address.

Any one of the methods 500, 600, 700 and 800 may be implemented according to the following step 3: Each of the UEs corresponding the set of downlink 5G QoS flows supporting gPTP signaling receives the timestamped Ethernet PDU and knows it contains gPTP signaling based on the downlink 5G QoS flow on which it is received (and therefore relays it to the egress DS-TT).

Any one of the methods 500, 600, 700 and 800 may be implemented according to the following step 4: The egress DS-TT performs an egress timestamp to calculate the 5GS residence time, updates the correction field of the gPTP Sync message accordingly and sends out the Ethernet PDU containing the updated gPTP Sync message to each of its connected end stations.

The step 4 may further comprise the following sub-step.

Sub-Step 4a: Since the UE receives the Ethernet PDU on a downlink 5G QoS flow dedicated for gPTP signaling, it can inform the egress DS-TT (e.g., using implementation) of the need to perform an egress timestamp for determining the 5G residence time. Alternatively, the egress DS-TT can be configured to recognize an Ethernet PDU multicast MAC address and/or an EtherType field value used for supporting signaling (and therefore examine these fields in the Ethernet PDU header to autonomously determine when an egress timestamping function needs to be performed).

Each end station supporting at least one TSN clock domain decides to further process the received Ethernet PDU due to it having a multicast MAC address and/or an EtherType field value reserved for gPTP signaling (all other end stations discard it).

The step 5 may further comprise any one of the following sub-steps.

Sub-Step 5a: The end station then extracts the gPTP message from the Ethernet PDU and determines if the indicated DomainNumber is of interest (i.e., end stations are assumed to be configured with a set of DomainNumber values of interest).

Sub-Step 5b: If the DomainNumber is of interest, the end station uses the gPTP message content to generate a current value for the corresponding TSN GM clock (otherwise the gPTP message is discarded).

In what follows, the second use case is described. The description is combinable with the disclosure of FIG. 10 (and FIG. 11 as to an exemplary structure of nodes and interfaces of the 5GS). While features and steps are described for the TSN system and the wireless network 900, the skilled person understands that each of these features and steps may be associated with or implemented by any one of the devices 100, 200, 300, and 400. Therefore, the below disclosure also discloses features and steps separately for each of the devices 100, 200, 300, and 400 and separately for each of the methods 500, 600, 700 and 800.

The second use case may apply to a TSN GM clock at an end station reachable through a DS-TT. For example, a 5G QoS flow is supported within the context of a PDU session and can be used exclusively for sending UE specific uplink gPTP traffic for the case where a TSN GM clock is supported by an end station reachable through a UE as the first radio device and/or the DS-TT.

Any one of the methods 500, 600, 700 and 800 may be implemented according to the following step 1: A UE is able to determine that it operates as part of a 5GS that serves as a TSN bridge (e.g. based on UE configuration information or based on the UE determining that it supports connectivity with one or more DS-TTs) and therefore triggers NAS signaling with the SMF to establish a PDU session as an always-on PDU Session of type "Ethernet PDU Session" (e.g., according to the sections 5.6.10.2 and 5.6.13 of the 3GPP document TS 23.501, version 16.4.0).

The step 1 may further comprise any one of the following sub-steps.

Sub-Step 1a: A PDU Session Establishment Request is sent from the UE to the SMF (via the AMF) and includes a flag indicating support for gPTP signaling is required. The SMF triggers the AMF to send the gNB a N2 PDU Session Request which includes PDU Session ID, QFIs, QoS Profile, CN tunnel Info, PDU Session type etc. A standardized or operator defined 5QI table index or QFI value can be the basis for a UE and gNB determining which specific 5G QoS flow is used for gPTP signaling. Within the 5GS, the PDU Session Establishment procedure (e.g., according to the document TS 23.502, version 16.4.0, clause 4.3.2) is used for QoS flow establishment.

Sub-Step 1b: gNB knowledge of this type of uplink 5G QoS flow allows it to determine that the UE is interested in receiving 5G System Clock information in which case it begins periodically providing that UE with 5G system clock information (used for ingress time stamping of gPTP signaling).

The step 1 may further comprise any one of the following sub-steps.

Sub-Step 1c: Same as Step 1c of the first use case.

Sub-Step 1d: With multiple UEs triggering NAS signaling that includes a flag indicating support for gPTP signaling is required, a UPF is able to determine the set of uplink 5G QoS flows that support gPTP signaling for which specific attributes may apply (e.g. the 5G system residence time corresponding to such 5G QoS flows may have a maximum value of 10 ms).

Any one of the methods 500, 600, 700 and 800 may be implemented according to the following step 2: An ingress DS-TT receives an Ethernet PDU (from an end station), makes an ingress time stamp and adds it to the Ethernet PDU (e.g. in the Suffix field of a Sync message).

The step 2 may further comprise any one of the following sub-steps.

Sub-Step 2a: A 5G Core network (e.g. SMF) can inform a UE about the specific multicast MAC address value and/or EtherType field value (e.g. x88F7) which, if received within an Ethernet PDU, indicates it contains gPTP signaling (or these specific values can be known by default by the UE application based on information provided by the gPTP signaling specifications i.e. IEEE802.1AS).

Sub-Step 2b: The UE can relay these values to the DS-TT (or these specific values can be known by default by the DS-TT application based on information provided by the gPTP signaling specifications i.e. IEEE802.1AS).

Sub-Step 2c: The DS-TT relays the timestamped Ethernet PDU to the UE which then relays it to UPF using the uplink 5G QoS flow configured for supporting gPTP signaling per Step 1. In this case there is one logical port to which gPTP signaling is to be relayed (i.e. the uplink 5G QoS flow configured to support gPTP signaling).

Sub-Step 2d: According to IEEE 802.1AS the Sync and announce and signaling, messages shall all make use of a reserved multicast address.

Any one of the methods 500, 600, 700 and 800 may be implemented according to the following step 3: The UPF receives the relayed Ethernet PDU and knows it contains gPTP signaling based on the uplink 5G QoS flow on which it is received.

Any one of the methods 500, 600, 700 and 800 may be implemented according to the following step 4: As per Step 1 of first use case, a UPF also determines the set of downlink 5G QoS flows corresponding to UEs that support gPTP signaling and therefore is able to relay gPTP signaling received on such uplink 5G QoS flows to the set of downlink 5G QoS flows supporting gPTP signaling.

The step 4 may further comprise any one of the following sub-steps.

Sub-Step 4a: Each of the UEs corresponding the set of downlink 5G QoS flows supporting gPTP signaling receives the timestamped Ethernet PDU and proceeds as described in steps 3, 4 and 5 of the first use case.

Any one of the methods 500, 600, 700 and 800 may be implemented according to the following step 5: The UPF may also relay gPTP signaling received on an uplink 5G QoS flow supporting gPTP signaling to an egress NW-TT for further distribution (i.e. to end stations reachable through the NW-TT).

The step 5 may further comprise any one of the following sub-steps.

Sub-Step 5a: Whether or not a UPF relays gPTP signaling to the NW-TT can be based on information provided to it by the 5G CN (e.g. SMF), which can be expected to have this topology information (e.g. for the case where a UE supports an end station that serves as the source of a TSN GM clock, NAS signaling sent from the UE to the SMF for "Ethernet PDU Session" establishment can include an additional flag indicating if the corresponding TSN GM clock needs to be distributed to end stations reachable through the NW-TT). One option is that the value of this particular flag can be based on 5GS knowledge of the TSN domain associated with a given TSN GM clock. TSN domain (e.g., according to the document TS 23.502, version 16.4.0) is a set of end stations, their ports and the attached LANs that transmit time sensitive streams using TSN standards.

Sub-Step 5b: The egress NW-TT performs an egress timestamp to calculate the 5GS residence time, updates the correction field of the gPTP Sync message accordingly and sends out the Ethernet PDU containing the updated gPTP Sync message to the TSN network.

Sub-Step 5c: Since the UPF receives the Ethernet PDU on an uplink 5G QoS flow dedicated for gPTP signaling and distributes it to the egress NW-TT it can include a flag (e.g. using implementation) indicating the egress NW-TT needs to perform an egress timestamp for determining the 5G residence time of that gPTP signaling. Alternatively, the egress NW-TT application can by default know the Ethernet PDU multicast MAC address and/or an EtherType field value used for supporting gPTP signaling (and therefore examine these fields in the Ethernet PDU header to autonomously determine when an egress timestamping function needs to be performed).

Furthermore, each embodiment of below set of embodiments is disclosed. Any one of the above embodiments and/or any of the listed embodiments (i.e., the embodiments in the list of claims) may be combined with one of the embodiments of below set of embodiments.

In a first embodiment of the set of embodiments, if a UE 100 determines it supports at least one end station that either requires reception of a TSN GM clock or that serves as the source of a TSN GM clock (e.g. based on UE configuration information or based on the UE determining that it supports connectivity with one or more DS-TTs), a PDU Session Establishment Request is sent from the UE to the SMF (via the AMF) and includes a flag indicating support for gPTP signaling is required. The SMF triggers the AMF to send the gNB a N2 PDU Session Request which includes PDU Session ID, QFIs, QoS Profile, CN tunnel Info, PDU Session type etc. A standardized or operator defined 5QI table index associated with a 5G QoS flow or QFI value can be the basis for a UE and gNB determining which specific 5G QoS flow is used for gPTP signaling.

For example, gNB knowledge of a downlink 5G QoS flow used for gPTP signaling allows it to determine that the corresponding UE is interested in receiving 5G system clock information in which case it begins periodically providing that UE with 5G system clock information (used by the UE/DS-TT for egress time stamping of gPTP signaling).

Alternatively or in addition, gNB knowledge of an uplink 5G QoS flow used for gPTP signaling allows it to determine that the corresponding UE is interested in receiving 5G system clock information in which case it begins periodically providing that UE with 5G system clock information (used by the UE/DS-TT for ingress time stamping of gPTP signaling).

In a second embodiment of the set of embodiments, the use of an enhanced Rel-17 method for providing a UE with a 5G system clock with a reduced level of uncertainty may be necessary in support of some TSN GM clocks. A UE can include a new flag within the UEAssistanceInformation, UECapabilityInformation or the UERadioAccessCapabilityInformation message to indicate whether or not it supports an "enhanced signaling method for 5G system clock provisioning".

In a third embodiment of the set of embodiments, whether or not a UPF relays gPTP signaling to the egress NW-TT can be based on information provided to it by the 5G CN (e.g. SMF), which can be expected to have this topology information (e.g. for the case where a UE supports an end station that serves as the source of a TSN GM clock, NAS signaling sent from the UE to the SMF for "Ethernet PDU Session" establishment can include an additional flag indicating if the corresponding TSN GM clock needs to be distributed to end stations reachable through the NW-TT). One option is that the value of this particular flag can be based on 5GS knowledge of the TSN domain associated with a given TSN GM clock. TSN domain (e.g., according to the document TS 23.502, version 16.4.0) is a set of end stations, their ports and the attached LANs that transmit time sensitive streams using TSN standards.

In a fourth embodiment of the set of embodiments, when a UPF receives an Ethernet PDU on an uplink 5G QoS flow dedicated for gPTP signaling and distributes it to the egress NW-TT it can include a flag indicating the egress NW-TT needs to perform an egress timestamp for determining the 5G residence time of that gPTP signaling. Alternatively, the egress NW-TT application can by default know the Ethernet PDU multicast MAC address and/or an EtherType field value used for supporting gPTP signaling (and therefore examine these fields in the Ethernet PDU header to autonomously determine when an egress timestamping function needs to be performed).

Figure 12:
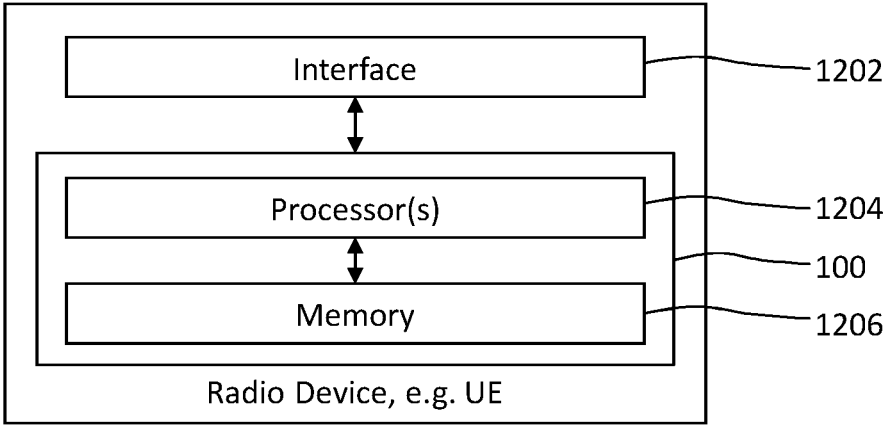
FIG. 12 shows a schematic block diagram of a radio device embodying the device of FIG. 1.

FIG. 12 shows a schematic block diagram for an embodiment of the device 100. The device 100 comprises one or more processors 1204 for performing the method 500 and memory 1206 coupled to the processors 1204. For example, the memory 1206 may be encoded with instructions that implement at least one of the modules 102, 104A/B and 106A/B.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1206, UE functionality. For example, the one or more processors 1204 may execute instructions stored in the memory 1206. Such functionality may include providing various features and steps discussed herein, including any of the benefits disclosed herein. The expression "the device being operative to perform an action" may denote the device 100 being configured to perform the action.

As schematically illustrated in FIG. 12, the device 100 may be embodied by a UE 1200, The UE 1200 comprises a radio interface 1202 coupled to the device 100 for radio communication with one or more base stations.

Figure 13:
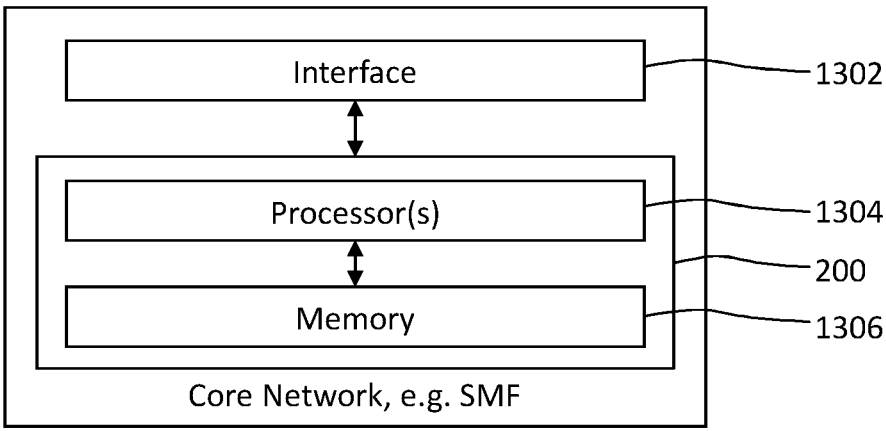
FIG. 13 shows a schematic block diagram of a core network embodying the device of FIG. 2.

FIG. 13 shows a schematic block diagram for an embodiment of the device 200. The device 200 comprises one or more processors 1304 for performing the method 600 and memory 1306 coupled to the processors 1304. For example, the memory 1306 may be encoded with instructions that implement at least one of the modules 202 and 204.

Figure 14:
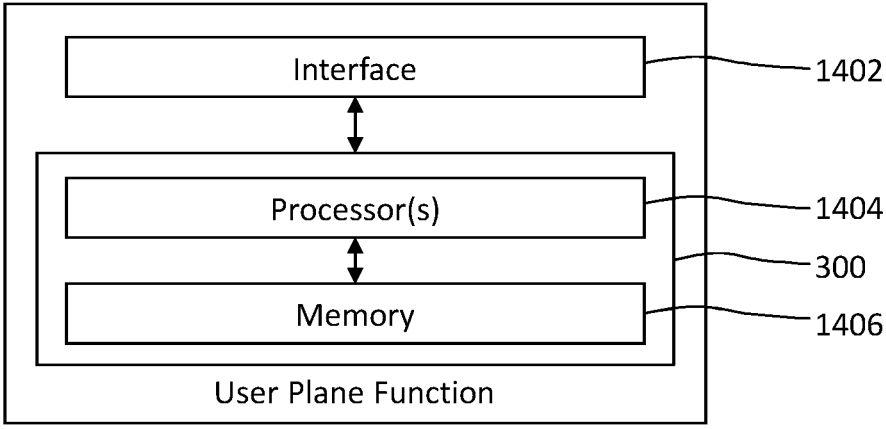
FIG. 14 shows a schematic block diagram of a user plane function embodying the device of FIG. 3.

FIG. 14 shows a schematic block diagram for an embodiment of the device 300. The device 300 comprises one or more processors 1404 for performing the method 700 and memory 1406 coupled to the processors 1404. For example, the memory 1406 may be encoded with instructions that implement at least one of the modules 302, 304, 306, and 308.

Figure 15:
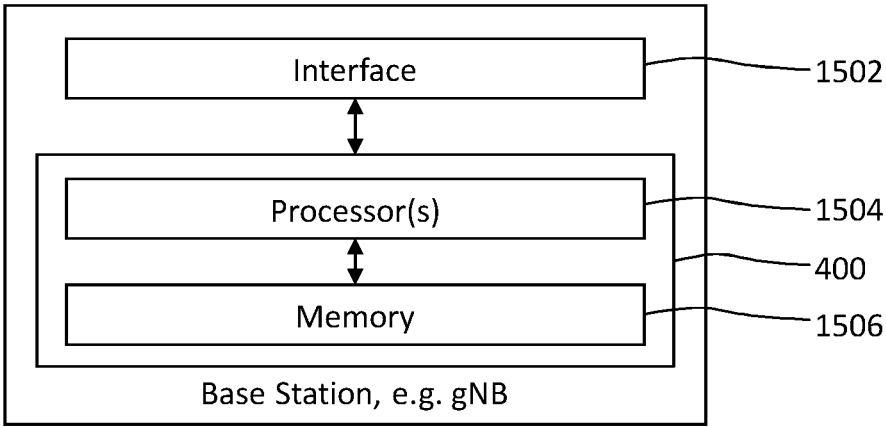
FIG. 15 shows a schematic block diagram of a base station embodying the device of FIG. 4.

FIG. 15 shows a schematic block diagram for an embodiment of the device 400. The device 400 comprises one or more processors 1504 for performing the method 800 and memory 1506 coupled to the processors 1504. For example, the memory 1506 may be encoded with instructions that implement at least one of the modules 402, 404, and 406.

Figure 16:
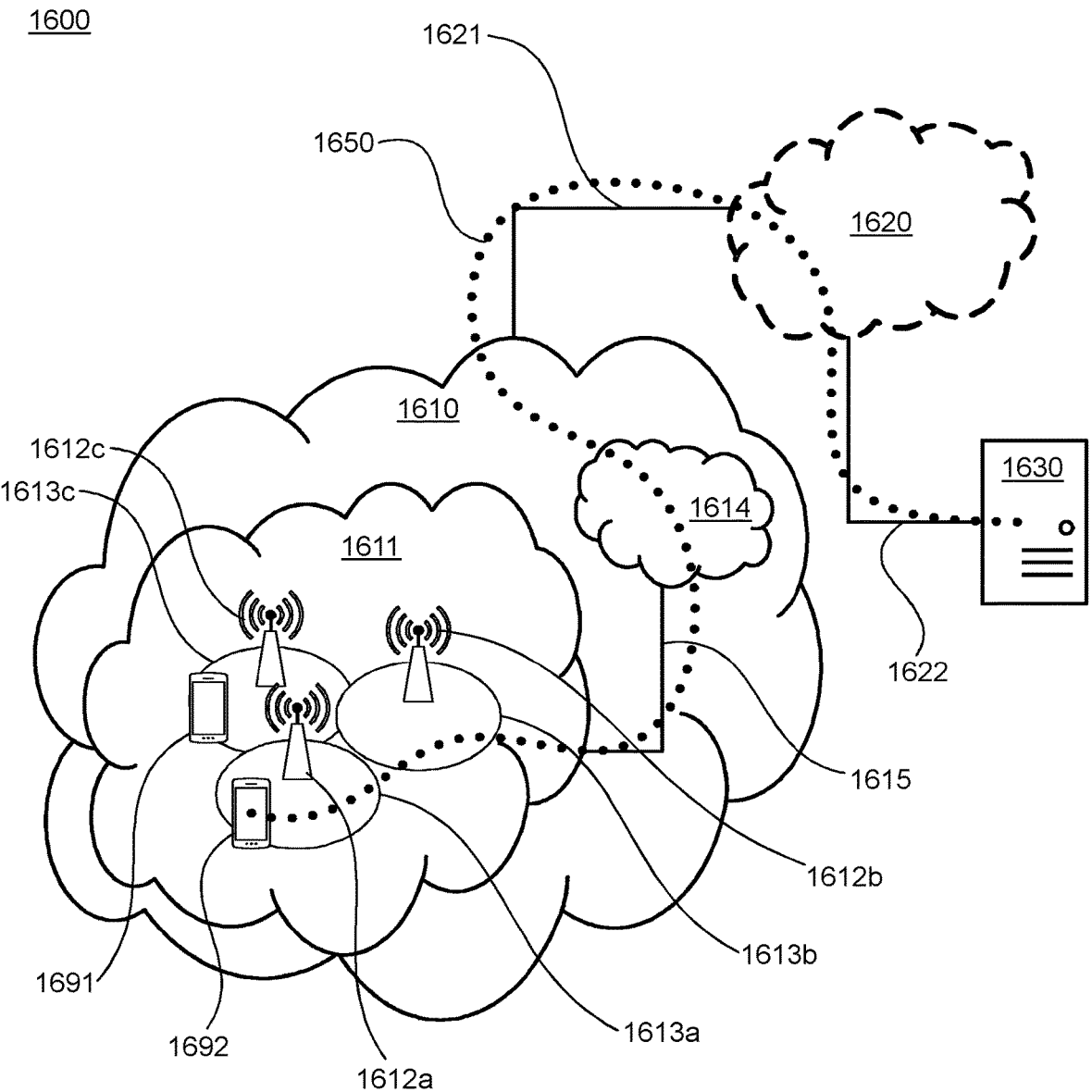
FIG. 16 schematically illustrates an example of a wireless network or telecommunications network connected via an intermediate network to a host computer.

With reference to FIG. 16, in accordance with an embodiment, a communication system 1600 includes a telecommunication network 1610, such as a 3GPP-type cellular network, which comprises an access network 1611, such as a radio access network, and a core network 1614. The access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to the core network 1614 over a wired or wireless connection 1615. A first user equipment (UE) 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Any of the base stations 1612 and the UEs 1691, 1692 may embody the device 100.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system 1600 of FIG. 16 as a whole enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630.

By virtue of the method 200 being performed by any one of the UEs 1691 or 1692 and/or any one of the base stations 1612, the performance of the OTT connection 1650 can be improved, e.g., in terms of increased throughput and/or reduced latency.

Example implementations, in accordance with an embodiment of the UE, base station and host computer discussed in the preceding paragraphs, will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data, which is transmitted using the OTT connection 1750. The user data may depend on the location of the UE 1730. The user data may comprise auxiliary information or precision advertisements (also: ads) delivered to the UE 1730. The location may be reported by the UE 1730 to the host computer, e.g., using the OTT connection 1750, and/or by the base station 1720, e.g., using a connection 1760.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least a wireless connection 1770 with a UE 1730 located in a coverage area (not shown in FIG. 17) served by the base station 1720. The communication interface 1726 may be configured to facilitate a connection 1760 to the host computer 1710. The connection 1760 may be direct, or it may pass through a core network (not shown in FIG. 17) of the telecommunication system and/or through one or more intermediate networks outside the telecommunication system. In the embodiment shown, the hardware 1725 of the base station 1720 further includes processing circuitry 1728, which may comprise one or more programmable processors, application-specific integrated circuits, field programmable gate arrays or combinations of these (not shown) adapted to execute instructions. The base station 1720 further has software 1721 stored internally or accessible via an external connection.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
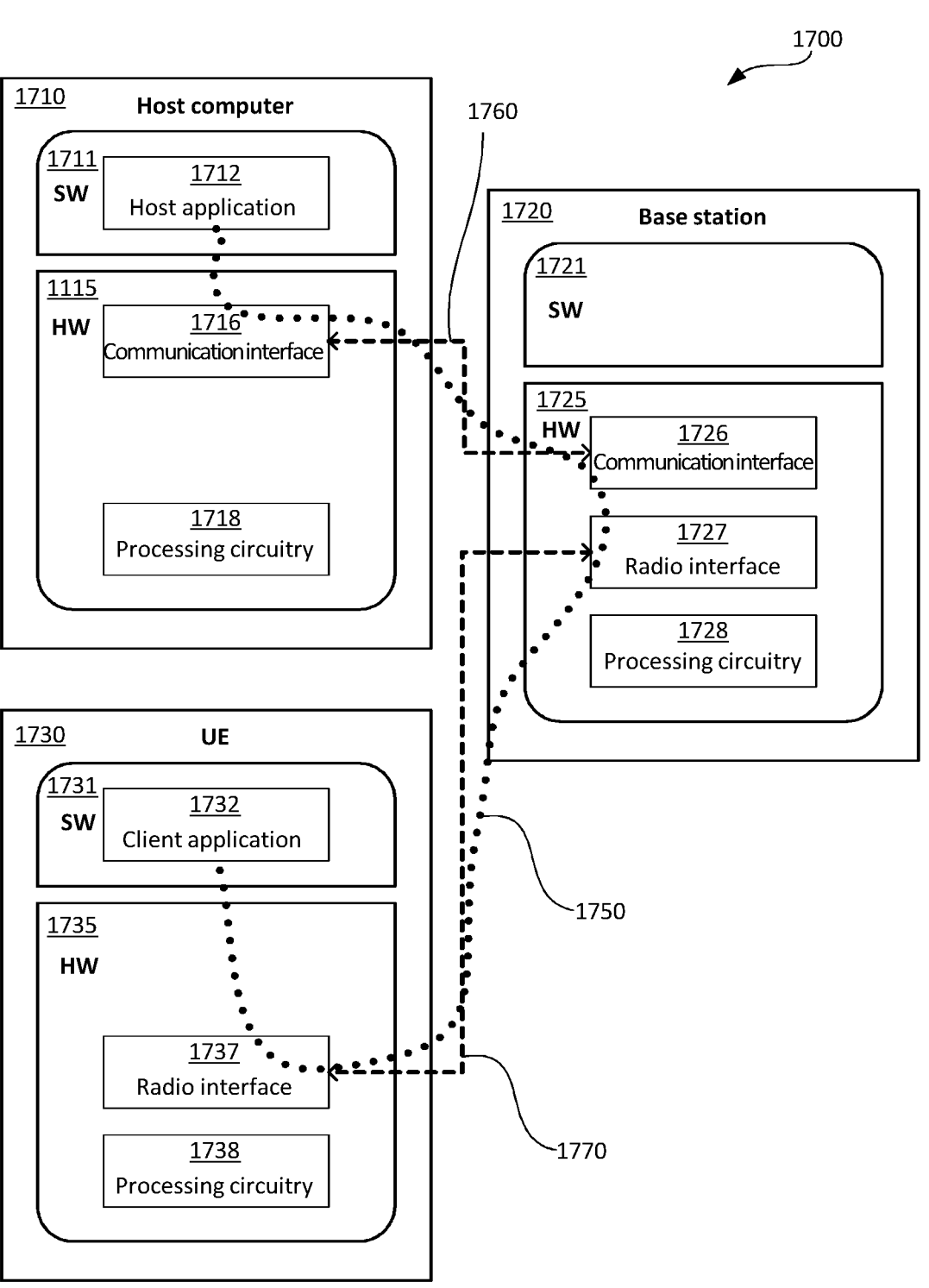
FIG. 17 shows a generalized block diagram of a host computer communicating via a base station or radio device functioning as a gateway with a user equipment over a partially wireless connection.

It is noted that the host computer 1710, base station 1720 and UE 1730 illustrated in FIG. 17 may be identical to the host computer 1630, one of the base stations 1612a, 1612b, 1612c and one of the UEs 1691, 1692 of FIG. 16, respectively. This is to say, the inner workings of these entities may be as shown in FIG. 17, and, independently, the surrounding network topology may be that of FIG. 16.

In FIG. 17, the OTT connection 1750 has been drawn abstractly to illustrate the communication between the host computer 1710 and the UE 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further take decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure. One or more of the various embodiments improve the performance of OTT services provided to the UE 1730 using the OTT connection 1750, in which the wireless connection 1770 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or "dummy" messages, using the OTT connection 1750 while it monitors propagation times, errors etc.

Figures 18, 19:
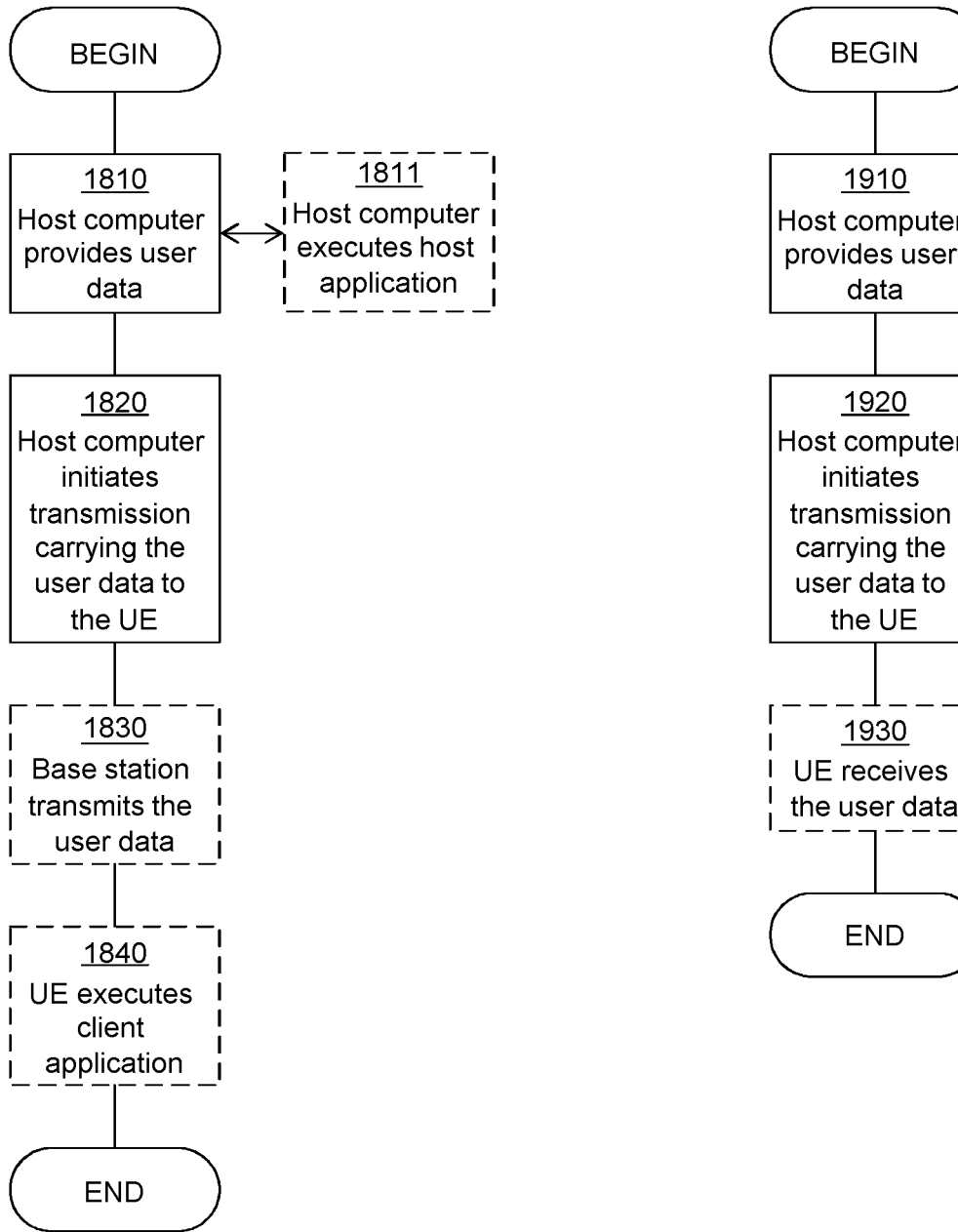
FIGS. 18 and 19 show flowcharts for methods implemented in a communication system including a host computer, a base station, and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this paragraph. In a first step 1810 of the method, the host computer provides user data. In an optional substep 1811 of the first step 1810, the host computer provides the user data by executing a host application. In a second step

1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this paragraph. In a first step 1910 of the method, the host computer provides user data. In an optional substep (not shown) the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

As has become apparent from above description, embodiments of the technique enable TSN GM clock distribution, e.g., for the two key use cases.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be implemented and/or limited by the scope of the following listed embodiments.

The invention claimed is:

1. A method of transporting a time protocol message for Time-Sensitive Networking (TSN) from a first station to a second station through a wireless network including at least one radio device wirelessly connected to at least one base station of the wireless network, the method performed by at least one radio device and comprising:

determining that the at least one radio device or the wireless network is arranged as a TSN bridge between the first station and the second station;

transmitting to the wireless network a radio device request message requesting establishment of a Packet Data Unit (PDU) session between the radio device and the wireless network, the radio device request message being indicative of a time protocol of the time protocol message, wherein the radio device request message is transmitted responsive to the determination; and receiving from or transmitting to the at least one base station of the wireless network the time protocol message according to a Quality of Service (QOS) flow for transporting the time protocol message in the wireless network, wherein the QoS flow is uniquely associated with at least one of the PDU session and the time protocol.

2. The method of claim 1, wherein the indication of the time protocol triggers the wireless network to include an ingress timestamp in the time protocol message upon ingress of the time protocol message at the wireless network.

3. The method of claim 1, wherein the indication of the time protocol triggers the wireless network to perform one or more of including an egress timestamp, performing an egress timestamp, and modifying the time protocol message to indicate the difference between the ingress and egress timestamps upon egress of the time protocol message at the wireless network.

4. The method of claim 1, the method further comprising or initiating the steps:

receiving, from the first station, the time protocol message; and transmitting, to the wireless network, the time protocol message including an ingress timestamp according to the time protocol in the PDU session.

5. The method of claim 1, the method further comprising:

receiving, from the wireless network, the time protocol message in the PDU session; and sending, to the second station, the time protocol message including an egress timestamp or an indication of the difference between the ingress timestamp and the egress timestamp according to the time protocol.

6. The method of claim 1, wherein the radio device request message comprises a flag that is indicative of the time protocol of the time protocol message.

7. The method of claim 1, wherein the determination comprises determining that the at least one radio device supports connectivity with at least one Device-Side TSN Translator (DS-TT).

8. The method of claim 7, wherein the time protocol message is received from the first station using an ingress DS-TT; or wherein the time protocol message is sent to the second station using an egress DS-TT;

wherein the ingress DS-TT is connected or connectable to the first station; or wherein the egress DS-TT is connected or connectable to the second station.

9. A method of transporting a time protocol message for Time-Sensitive Networking (TSN) from a first station to a second station through a wireless network including at least one radio device wirelessly connected to a base station of the wireless network, the method performed by a Core Network (CN) of the wireless network and comprising:

receiving, from the at least one radio device, a radio device request message requesting establishment of a Packet Data Unit (PDU) session between the radio device and the wireless network, the radio device request message being indicative of a time protocol of the time protocol message, wherein the radio device request message is received responsive to determining, by the at least one radio device, that the at least one radio device or the wireless network is arranged as a TSN bridge between the first station and the second station; and responsive to the indication of the time protocol in the radio device request message, sending, to the base station of the wireless network, a CN request message requesting the establishment of the PDU session between the at least one radio device and the wireless network, the CN request message being indicative of a Quality of Service (QOS) flow for transporting the time protocol message in the wireless network.

10. The method of claim 9, wherein the wireless network comprises at least one Network-Side TSN Translator (NW-TT) connected to a User Plane Function (UPF) of the wireless network, and wherein the indication of the time protocol and/or the indication of the QoS flow triggers the UPF or the NW-TT to include in the time protocol message at least one of:

an ingress timestamp, an egress timestamp, and a difference between the ingress and egress timestamps.

11. The method of claim 9, wherein the wireless network comprises at least one Device-Side TSN Translator (DS-TT) connected to the at least one radio device of the wireless network, and wherein the indication of the time protocol or the indication of the QoS flow triggers the radio device or the DS-TT to include in the time protocol message least one of:

an ingress timestamp, an egress timestamp, and a difference between the ingress and egress timestamps.

12. The method of claim 9, wherein the QoS flow is used exclusively for transporting messages according to the time protocol.

13. The method of claim 9, wherein at least one of the PDU session and the QoS flow is indicated by means of a QoS Flow Identifier (QFI) or a QoS indicator.

14. The method of claim 13, wherein a predefined or configured table comprises an entry for the QoS flow used for the transporting of the time protocol message in the wireless network, optionally the QFI or QoS indicator being an index of the table.

15. The method of claim 9, wherein the core network comprises an Access and Mobility management Function (AMF) and a Session Management Function (SMF), the method being performed by the SMF, wherein the SMF triggers the AMF to send the CN request message to the base station.

16. A method of transporting a time protocol message for Time-Sensitive Networking (TSN) from a first station to a second station through a wireless network including at least one radio device wirelessly connected to the wireless network, the method performed by a User Plane Function (UPF) of the wireless network and comprising:

storing a criterion for a Packet Data Unit (PDU) comprising a time protocol message from the first station, wherein a radio device request message indicative of the time protocol of the time protocol message is received by a Core Network (CN) responsive to determining, by the at least one radio device, that the at least one radio device or the wireless network is arranged as a TSN bridge between the first station and the second station; and relaying a PDU to the at least one radio device connected to the second station, if the PDU fulfills the criterion.

17. The method of claim 16, wherein the step of storing the criterion comprises:

receiving, from a CN of the wireless network, a CN control message that is indicative of the criterion for the PDU comprising the time protocol message according to the time protocol of the TSN.

18. The method of claim 17, wherein the criterion comprises at least one of:

a link layer criterion for at least one link layer field in the PDU;

a Medium Access Control (MAC) address in the PDU; and an Ethertype field value in the PDU.

19. The method of claim 17, wherein the wireless network comprises an ingress Network-Side TSN Translator (NW-TT) connected to the UPF, the method further comprising or initiating the steps performed by the UPF:

forwarding the criterion to the ingress NW-TT; and receiving the PDU fulfilling the criterion from the ingress NW-TT.

20. The method of claim 17, wherein fulfilment of the criterion triggers at least one of an ingress Network-Side TSN Translator (NW-TT) and the UPF to include an ingress timestamp in the time protocol message upon ingress of the time protocol message at the wireless network.

21. A method of transporting a time protocol message for Time-Sensitive Networking (TSN) from a first station to a second station through a wireless network including at least one radio device wirelessly connected to a base station of the wireless network, the method performed by the base station and comprising:

receiving, from a Core Network (CN) of the wireless network, a CN request message requesting establishment of a Packet Data Unit (PDU) session between the radio device and the wireless network, the CN request message being indicative of a Quality of Service (QOS) flow for transporting the time protocol message in the wireless network, wherein the CN request message is received responsive to an indication of the time protocol in a radio device request message received by the CN, wherein the receiving of the radio device request message is responsive to determining, by the at least one radio device, that the at least one radio device or the wireless network is arranged as a TSN bridge between the first station and the second station; and transmitting to the at least one radio device or receiving from the at least one radio device the time protocol message according to the QoS flow.

22. The method of claim 21, further comprising or initiating the step performed by the base station:

responsive to the indication of the QoS flow for the transporting of the time protocol message, transmitting a time reference of the wireless network to the at least one radio device for including an ingress timestamp or an egress timestamp in the time protocol message or performing an egress timestamp at the at least one radio device.

23. The method of claim 21, further comprising or initiating the step performed by the base station:

receiving a capability information message from the at least one radio device, the capability information message being indicative of a type of the time reference to be provided by the base station.

24. A User Equipment (UE) operative in a wireless communication network and configured to communicate with at least one base station or with at least one radio device functioning as a gateway, the UE comprising a radio interface and processing circuitry configured to:

determine that the at least one radio device or the wireless network is arranged as a Time-Sensitive Networking (TSN) bridge between the first station and the second station;

transmit to the wireless network a radio device request message requesting establishment of a Packet Data Unit (PDU) session between the radio device and the wireless network, the radio device request message being indicative of a time protocol of the time protocol message, wherein the radio device request message is transmitted responsive to the determination; and receive from or transmit to the at least one base station of the wireless network the time protocol message according to a Quality of Service (QOS) flow for transporting the time protocol message in the wireless network, wherein the QoS flow is uniquely associated with at least one of the PDU session and the time protocol.

25. A device for transporting a time protocol message for Time-Sensitive Networking (TSN) from a first station to a second station through a wireless network including at least one radio device wirelessly connected to a base station of the wireless network, the device comprising memory operable to store instructions and processing circuitry operable to execute the instructions, such that the device is operable to:

receive, from the at least one radio device, a radio device request message requesting establishment of a Packet Data Unit (PDU) session between the radio device and the wireless network, the radio device request message being indicative of a time protocol of the time protocol message, wherein the radio device request message is received responsive to determining, by the at least one radio device, that the at least one radio device or the wireless network is arranged as a TSN bridge between the first station and the second station; and responsive to the indication of the time protocol in the radio device request message, send, to the base station of the wireless network, a Core Network (CN) request message requesting the establishment of the PDU session between the at least one radio device and the wireless network, the CN request message being indicative of a Quality of Service (QOS) flow for transporting the time protocol message in the wireless network.

26. A network node implementing a Session Management Function (SMF) for transporting a time protocol message for Time-Sensitive Networking (TSN) from a first station to a second station through a wireless network including at least one radio device wirelessly connected to a base station of the wireless network, the network node comprising an interface and processing circuitry configured to:

receive, from the at least one radio device, a radio device request message requesting establishment of a Packet Data Unit (PDU) session between the radio device and the wireless network, the radio device request message being indicative of a time protocol of the time protocol message, wherein the radio device request message is received responsive to determining, by the at least one radio device, that the at least one radio device or the wireless network is arranged as a TSN bridge between the first station and the second station; and responsive to the indication of the time protocol in the radio device request message, send, to the base station of the wireless network, a Core Network (CN) request message requesting the establishment of the PDU session between the at least one radio device and the wireless network, the CN request message being indicative of a Quality of Service (QOS) flow for transporting the time protocol message in the wireless network.

27. A network node implementing a User Plane Function (UPF) for transporting a time protocol message for time-sensitive networking (TSN) from a first station to a second station through a wireless network including at least one radio device wirelessly connected to the wireless network, the network node comprising an interface and processing circuitry configured to:

store a criterion for a Packet Data Unit (PDU) comprising a time protocol message from the first station, wherein a radio device request message indicative of the time protocol of the time protocol message is received by a Core Network (CN) responsive to determining, by the at least one radio device, that the at least one radio device or the wireless network is arranged as a TSN bridge between the first station and the second station; and relay a PDU to the at least one radio device connected to the second station, if the PDU fulfills the criterion.

28. A base station for transporting a time protocol message for Time-Sensitive Networking (TSN) from a first station to a second station through a wireless network including at least one radio device wirelessly connected to a base station of the wireless network, the base station being configured to communicate with a User Equipment (UE), the base station comprising a radio interface and processing circuitry configured to:

receive, from a Core Network (CN) of the wireless network, a CN request message requesting establishment of a Packet Data Unit (PDU) session between the at least one radio device and the wireless network, the CN request message being indicative of a Quality of Service (QOS) flow for transporting the time protocol message in the wireless network, wherein the CN request message is received responsive to an indication of the time protocol in a radio device request message received by the CN, wherein the receiving of the radio device request message is responsive to determining, by the at least one radio device, that the at least one radio device or the wireless network is arranged as a TSN bridge between the first station and the second station; and transmit to the at least one radio device or receive from the at least one radio device the time protocol message according to the QoS flow.

\* \* \* \* \*